(12) United States Patent  (10) Patent No.: US 8,595,222 B2
Dean  (45) Date of Patent: Nov. 26, 2013

(54) METHODS AND SYSTEMS FOR REPRESENTING, USING AND DISPLAYING TIME-VARYING INFORMATION ON THE SEMANTIC WEB

(75) Inventor: Michael Anthony Dean, Liberty Lake, WA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 721 days.

(21) Appl. No.: 12/240,605

(22) Filed: Sep. 29, 2008

(65) Prior Publication Data

US 2010/0281045 A1    Nov. 4, 2010

Related U.S. Application Data

(63) Continuation of application No. 10/806,406, filed on Mar. 23, 2004, now abandoned.

(60) Provisional application No. 60/465,925, filed on Apr. 28, 2003.

(51) Int. Cl.
    *G06F 17/30*    (2006.01)
(52) U.S. Cl.
    USPC ............................................ 707/725; 707/794
(58) Field of Classification Search
    USPC ............................................................ 707/600
    See application file for complete search history.

(56) References Cited

U.S. PATENT DOCUMENTS

| 4,599,691 | A | 7/1986 | Sakaki |
| 4,754,326 | A | 6/1988 | Kram et al. |
| 4,809,351 | A | 2/1989 | Abramovitz et al. |
| 4,914,590 | A | 4/1990 | Loatman et al. |
| 5,062,143 | A | 10/1991 | Schmitt |
| 5,343,537 | A | 8/1994 | Bellegarda et al. |

(Continued)

FOREIGN PATENT DOCUMENTS

| CA | 2 485 554 | 11/2003 |
| JP | 59-208673 | 11/1984 |

(Continued)

OTHER PUBLICATIONS

Gerevini et al. Qualitative Spatio-Temoral Reasoning with RCC-8 and Allen's Interval Calculus: Computation Complexity, published 2002 CiteSeerx.*

(Continued)

*Primary Examiner* — Neveen Abel Jalil
*Assistant Examiner* — Kevin L Young
(74) *Attorney, Agent, or Firm* — Ropes & Gray LLP

(57) ABSTRACT

Methods and systems for providing start and stop properties to Semantic Web structured resources and statements are disclosed. The start and stop properties can specify a lifetime during which a resource or statement can be valid. A call or query to one or more resources can return statement data including the start and stop properties for the resources and/or statements. Dates can be specified with the call or query such that the returned resources and statements have lifetimes including the specified dates. Screen images of the data can display subject and object nodes and predicate arcs for the selected dates. A sequence of screen images can display a timeline of nodes and arcs by adding or hiding nodes and arcs to correspond with the start and stop properties of the statements. Tools are provided for the user to navigate through the sequence.

22 Claims, 16 Drawing Sheets

(56) References Cited

U.S. PATENT DOCUMENTS

| | | | |
|---|---|---|---|
| 5,396,419 A | 3/1995 | Morimoto | |
| 5,406,480 A | 4/1995 | Kanno et al. | |
| 5,418,717 A | 5/1995 | Su et al. | |
| 5,438,630 A | 8/1995 | Chen et al. | |
| 5,492,473 A | 2/1996 | Shea | |
| 5,544,257 A | 8/1996 | Bellegarda et al. | |
| 5,694,559 A | 12/1997 | Hobson et al. | |
| 5,745,113 A | 4/1998 | Jordan et al. | |
| 5,752,052 A | 5/1998 | Richardson et al. | |
| 5,757,960 A | 5/1998 | Murdock et al. | |
| 5,787,198 A | 7/1998 | Agazzi et al. | |
| 5,822,747 A | 10/1998 | Graefe | |
| 5,839,106 A | 11/1998 | Bellegarda | |
| 5,841,895 A | 11/1998 | Huffman | |
| 5,862,259 A | 1/1999 | Bokser et al. | |
| 5,903,858 A | 5/1999 | Saraki | |
| 5,926,180 A | 7/1999 | Shimamura | |
| 5,926,784 A | 7/1999 | Richardson et al. | |
| 5,933,525 A | 8/1999 | Makhoul et al. | |
| 5,940,821 A | 8/1999 | Wical | |
| 5,963,940 A | 10/1999 | Liddy et al. | |
| 5,963,965 A | 10/1999 | Vogel | |
| 6,006,221 A | 12/1999 | Liddy et al. | |
| 6,021,403 A | 2/2000 | Horvitz | |
| 6,026,388 A | 2/2000 | Liddy et al. | |
| 6,029,195 A | 2/2000 | Herz | |
| 6,105,022 A | 8/2000 | Takahashi et al. | |
| 6,112,168 A | 8/2000 | Corston et al. | |
| 6,167,369 A | 12/2000 | Schultz | |
| 6,243,669 B1 | 6/2001 | Horiguchi et al. | |
| 6,243,670 B1 | 6/2001 | Bessho | |
| 6,260,035 B1 | 7/2001 | Horvitz et al. | |
| 6,278,967 B1 | 8/2001 | Akers et al. | |
| 6,278,968 B1 | 8/2001 | Franz et al. | |
| 6,304,870 B1 | 10/2001 | Kushmerick et al. | |
| 6,430,552 B1 | 8/2002 | Corston-Oliver | |
| 6,442,584 B1 | 8/2002 | Kolli et al. | |
| 6,600,501 B1 * | 7/2003 | Israel et al. | 715/810 |
| 6,606,625 B1 | 8/2003 | Muslea et al. | |
| 6,609,087 B1 | 8/2003 | Miller et al. | |
| 6,615,207 B1 | 9/2003 | Lawrence | |
| 6,681,044 B1 | 1/2004 | Ma et al. | |
| 6,785,673 B1 | 8/2004 | Fernandez et al. | |
| 6,795,825 B2 | 9/2004 | Rishe | |
| 6,839,714 B2 | 1/2005 | Wheeler et al. | |
| 6,853,992 B2 | 2/2005 | Igata | |
| 6,856,992 B2 * | 2/2005 | Britton et al. | 707/689 |
| 6,892,189 B2 | 5/2005 | Quass et al. | |
| 6,950,753 B1 | 9/2005 | Rzhetsky et al. | |
| 7,031,970 B2 | 4/2006 | Blitzer | |
| 7,062,483 B2 | 6/2006 | Ferrari | |
| 7,081,834 B2 | 7/2006 | Ruokangas et al. | |
| 7,146,030 B2 | 12/2006 | Vailaya et al. | |
| 7,146,349 B2 | 12/2006 | Benitez-Jimenez et al. | |
| 7,149,687 B1 | 12/2006 | Gorin et al. | |
| 7,249,013 B2 | 7/2007 | Al-Onaizan et al. | |
| 7,287,026 B2 | 10/2007 | Oommen | |
| 7,292,976 B1 | 11/2007 | Hakkani-Tur et al. | |
| 7,346,490 B2 | 3/2008 | Fass et al. | |
| 7,496,621 B2 | 2/2009 | Pan et al. | |
| 7,530,020 B2 | 5/2009 | Szabo | |
| 7,620,538 B2 | 11/2009 | Marcu et al. | |
| 7,853,444 B2 | 12/2010 | Wang et al. | |
| 7,890,539 B2 | 2/2011 | Boschee et al. | |
| 7,987,176 B2 | 7/2011 | Latzina et al. | |
| 2001/0029455 A1 | 10/2001 | Chin et al. | |
| 2002/0007383 A1 | 1/2002 | Yoden et al. | |
| 2002/0035466 A1 | 3/2002 | Kodama | |
| 2002/0143537 A1 | 10/2002 | Ozawa et al. | |
| 2003/0078766 A1 | 4/2003 | Appelt et al. | |
| 2003/0093613 A1 | 5/2003 | Sherman | |
| 2003/0120640 A1 | 6/2003 | Ohta et al. | |
| 2003/0182310 A1 * | 9/2003 | Charnock et al. | 707/104.1 |
| 2003/0189933 A1 | 10/2003 | Ozugur et al. | |
| 2003/0208499 A1 * | 11/2003 | Bigwood et al. | 707/100 |
| 2003/0212543 A1 | 11/2003 | Epstein et al. | |
| 2003/0216905 A1 | 11/2003 | Chelba et al. | |
| 2004/0039734 A1 | 2/2004 | Judd et al. | |
| 2004/0049495 A1 | 3/2004 | Lee et al. | |
| 2004/0054521 A1 | 3/2004 | Liu | |
| 2004/0098670 A1 | 5/2004 | Carroll | |
| 2004/0107118 A1 | 6/2004 | Harnsberger et al. | |
| 2004/0111253 A1 | 6/2004 | Luo | |
| 2004/0162806 A1 | 8/2004 | Liu | |
| 2004/0243531 A1 | 12/2004 | Dean | |
| 2005/0039123 A1 | 2/2005 | Kuchinsky et al. | |
| 2005/0278325 A1 | 12/2005 | Mihalcea et al. | |
| 2005/0283365 A1 | 12/2005 | Mizutani et al. | |
| 2006/0015320 A1 | 1/2006 | Och | |
| 2006/0036592 A1 | 2/2006 | Das et al. | |
| 2006/0116866 A1 | 6/2006 | Suzuki et al. | |
| 2006/0242101 A1 | 10/2006 | Akkiraju et al. | |
| 2006/0245641 A1 | 11/2006 | Viola et al. | |
| 2006/0253274 A1 | 11/2006 | Miller | |
| 2006/0253476 A1 | 11/2006 | Roth et al. | |
| 2007/0011150 A1 | 1/2007 | Frank | |
| 2007/0136246 A1 | 6/2007 | Stenchikova et al. | |
| 2007/0233696 A1 | 10/2007 | Ishihara et al. | |
| 2008/0040095 A1 | 2/2008 | Sinha et al. | |
| 2008/0215309 A1 | 9/2008 | Weischedel et al. | |
| 2009/0006447 A1 | 1/2009 | Balmin et al. | |
| 2009/0024385 A1 | 1/2009 | Hirsch | |
| 2009/0063473 A1 | 3/2009 | Van Den Berg et al. | |
| 2011/0153673 A1 | 6/2011 | Boschee et al. | |

FOREIGN PATENT DOCUMENTS

| | | |
|---|---|---|
| JP | 60-247784 | 12/1985 |
| JP | 11-109843 | 4/1999 |
| JP | 2007-18462 | 1/2007 |
| WO | WO 93/18483 | 9/1993 |
| WO | WO 02/37328 | 5/2002 |
| WO | WO 03/098466 | 11/2003 |

OTHER PUBLICATIONS

Buraga et al. A RDF-based Model for Expressing Spatio-Temporal Relations Between Web Sites, Published by IEEE 2002.*

Reggiori et al. (http://www.w3.org/2001/sw/Europe/events/20031113-storage/positions/asemantics.html, Oct. 2003).*

Pustejovsky et al. (http://www.timeml.org/site/publications/timeMLpubs/IWCS-v4.pdf, 2003).*

Klapsing et al. (Semantics in web engineering: Applying the resource description framework, http://ieeexplore.ieee.org/xpls/abs_all.jsp?arnumber=917972, 2001).*

ACE (Automatic Content Extraction) English Annotation Guidelines for Entities, Ver.5.6.1, Linguistic Data Consortium, 34 pages. May 2005. http://www.ldc.upenn.edu/Projects/ACE/.

Agazzi, O.E., et al., "Hidden Markov Model Based Optical Character Recognition in the Presence of Deterministic Transformations," Pattern Recognition, vol. 26, No. 12, pp. 1813-1826, Dec. 1993.

Al-Badr, B., et al., "Survey and bibliography of Arabic optical text recognition," Signal Processing, vol. 41, No. 1, pp. 49-77, Jan. 1995.

Anigbogu, J.C., et al., "Performance Evaluation of an HMM Based OCR System," Proceedings of the 11th International Conference on Pattern Recognition, The Hague, The Netherlands, pp. 565-568, Aug. 1992.

Andreevskaia, A., et al., "Can Shallow Predicate Argument Structures Determine Entailment?," Proceedings from the 1st PASCAL Recognising Textual Entailment Challenge (RTE I), 4 pages, Southampton, UK, Apr. 2005.

Aone, C., et al., "SRA: Description of the IE2 System Used for MUC-7," Proceedings of the 7th Message Understanding Conference (MUC-7), pp. 1-14, 1998. Available at: http://www.itl.nist.gov/iaui/894.02/related_projects/muc/proceedings/muc_7_proceedings/sra_muc7.pdf.

Barzilay, R., et al., "Sentence Fusion for Multidocument News Summarization," Association for Computational Linguistics, vol. 31, No. 3, pp. 297-327, Sep. 2005.

Bellegarda, J., et al., "Tied Mixture Continuous Parameter Models for Large Vocabulary Isolated Speech Recognition," IEEE International Conference on Acoustics, Speech, and Signal Processing, pp. 13-16, May 23-26, 1989.

(56) References Cited

OTHER PUBLICATIONS

Bennett, S.W., et al., "Learning to Tag Multilingual Texts Through Observation," Proceedings of the Second Conference on Empirical Methods in Natural Language Processing, Association for Computational Linguistics, pp. 109-116, 1997.

Bippus, et al., "Cursive Script Recognition Using Semi Continuous Hidden Markov Models in Combination with Simple Features," IEE European Workshop on Handwriting Analysis and Recognition, pp. 6/1-6, Brussels, Jul. 1994.

Bock, J., et al., "Conceptual accessibility and syntactic structure in sentence formulation," Cognition 21, pp. 47-67, 1985.

Bose, et al., "Connected and Degraded Text Recognition Using Hidden Markov Model," Proceedings of the 11th International Conference on Pattern Recognition, vol. II, pp. 116-119, Aug. 3-Sep. 2, 1992.

Brill, E., "Automatic Grammar Induction and Parsing Free Text: A Transformation-Based Approach," Proceedings of the 31st Annual Meeting of the Association for Computational Linguistics, pp. 259-265, 1993.

Cardie, C., "Empirical Methods in Information Extraction," American Association of Artificial Intelligence (AAAI), vol. 18, No. 4, pp. 65-80, 1997.

Collins, M., "Three Generative, Lexicalised Models for Statistical Parsing," Proceedings of the 35th Annual Meeting of the Association for Computational Linguistics and 8th Conference of the European Chapter of the Association for Computational Linguistics, pp. 16-23, 1997.

Conrad, J.G., "A system for Discovering Relationships by Feature Extraction from Text Databases," Proceedings of the 17th Annual International ACM SIGIR Conference on Research and Development in Information Retrieval (SIGIR-94), pp. 260-270, 1994.

Cowie, J., "Information Extraction," Communications of the ACM, vol. 39, Issue 1, pp. 80-91, Jan. 1996.

De Marneffe, M.-C., et al., "Generating Typed Dependency Parses from Phrase Structure Parses"; Proceedings of 5th International Conference on Language Resources and Evaluation, pp. 1-6, Genoa, Italy, 2006.

De Salvo Braz, R., et al., "Knowledge Representation for Semantic Entailment and Question-Answering," Department of Computer Science, University of Illinois, pp. 1-10, 2005.

Dowding, J., et al., "Gemini: A Natural Language System for Spoken-Language Understanding," Annual Meeting of the Association for Computational Linguistics, pp. 54-61, Columbus, OH, 1993.

Fellbaum, C., "WordNet, an Electronic Lexical Database," MIT Press, 422 pages, Cambridge, MA, 1998.

Finn, A., et al., "Active Learning Selection Strategies for Information Extraction," Proceedings of the International Workshop on Adaptive Text Extraction and Mining, pp. 1-8, 2003.

Florian, R., et al., "A Statistical Model for Multilingual Entity Detection and Tracking," Proceedings of Human Language Technology Conference North American Association for Computational Linguistics, pp. 1-8, Boston, MA, 2004.

Forney, G.D., et al., "The Viterbi Algorithm," Proceedings of the IEEE, vol. 61, No. 3, pp. 268-278, 1973.

Gildea, D., "Loosely Tree-Based Alignment for Machine Translation," Proceedings of the 41st Annual Meeting of the Association for Computational Linguistics, pp. 80-87, Supporo, Japan, 2003.

Goldman, S., et al., "Enhancing Supervised Learning with Unlabeled Data," Proceedings of the 17th International Conference on Machine Learning (ICML-00), pp. 327-334, San Francisco, CA, 2000.

Gonzalez, et al., "Digital Image Processing," Addison-Wesley Pub Co., pp. 416-418, 1992.

Grishman, R., "Information Extraction," Handbook of Computational Linguistics, pp. 1-11, 2003.

Grishman, R., "Adaptive Information Extraction and Sublanguage Analysis" Proceedings of the Workshop on Adaptive Text Extraction and Mining, 17th International Joint Conference on Artificial Intelligence (IJCAI-2001), pp. 1-4, Seattle, Washington, Aug. 2001.

Grishman, R., et al., "NYU's English ACE 2005 System Description," ACE 05 Evaluation Workshop, 2005. Online at http://nlp.cs.nyu.edu/publication.

Grisham, R., "Discovery Methods for Information Extraction," Proceedings of the ISCA & IEEE Workshop on Spontaneous Speech Processing and Recognition, Tokyo Institute of Technology, pp. 1-5, Tokyo, Japan, Apr. 2003.

Hasegawa, T., et al., "Discovering Relations among Named Entities from Large Corpora," Proceedings of the 42nd Annual Meeting of Association of Computational Linguistics (ACL-04), pp. 415-422, Barcelona, Spain, 2004.

Herrera, J., et al., "Textual Entailment Recognition Based on Dependency Analysis and WordNet," Proceedings of the 1st PASCAL Challenges Workshop on Recognising Textual Entailment, pp. 21-24, Southampton, UK, Apr. 2005.

Hoffmann C.M., et al., "Pattern Matching in Trees"; Journal of the Association for Computer Machinery, vol. 29, No. 1, pp. 68-95, Jan. 1982.

Humphreys, K., et al., "University of Sheffield: Description of the LaSIE-II System as Used for MUC-7," Proceedings of the 7th Message Understanding Conference (MUC-7), pp. 1-20, 1998. Available at: http://www.itl.nist.gov/iaui/894.02/related_projects/muc/proceedings/muc_7_proceedings/sheffield_muc7.pdf.

Ji, H., et al., "Applying Coreference to Improve Name Recognition," Proceedings of the ACL 2004 Workshop on Reference Resolution and Its Applications, pp. 1-8, Barcelona, Spain, Jul. 2004.

Jones, R., et al., "Active Learning for Information Extraction with Multiple View Feature Sets," 20th International Workshop on Adaptive Text Extraction and Mining, pp. 1-8, Washington, DC, Aug. 21-24, 2003.

Kaltenmeier, et al., "Sophisticated Topology of Hidden Markov Models for Cursive Script Recognition," Proceedings of the Second International Conference on Document Analysis and Recognition, pp. 139-142, Tsukuba, Japan, Oct. 1993.

Kambhatla, N., "Combining Lexical, Syntactic, and Semantic Features with Maximum Entropy Models for Extracting Relations," Proceedings of the 42nd Anniversary Meeting of the Association for Computational Linguistics, pp. 1-4, 2004.

Karov, Y., et al., "Similarity-based Word Sense Disambiguation," Association for Computational Linguistics, vol. 24, Issue 1, pp. 1-26, Mar. 1998.

Kehler, A., et al., "The (Non) Utility of Predicate-Argument Frequencies for Pronoun Interpretation" Proceedings of Human Language Technology Conference, pp. 289-296, 2004.

Kehler, A. "Probabilistic Coreference in Information Extraction," Proceeding of the 2nd Conference on Empirical Methods in Natural Language Processing (EMNLP-2), pp. 163-173, Providence, RI, Aug. 1-2, 1997.

Kehler, A., et al., "Competitive Self-Trained Pronoun Interpretation," Proceedings of the Human Language Technology Conference, North American Chapter of the Association for Computational Linguistics, pp. 33-36, May 2004.

Kehler, A., "Current Theories of Centering for Pronoun Interpretation: A Critical Evaluation," Computational Linguistics, vol. 23, No. 3, pp. 467-475, 1997.

Kopec, G., et al., "Document Image Decoding Using Markov Source Models," IEEE. Transactions on Pattern Analysis and Machine Intelligence, vol. 16, pp. 1-13, 1994.

Kilpeläinen, P., "Tree Matching Problems with Applications to Structure Text Databases," PhD thesis, Department of Computer Science, University of Helsinki, 113 pages, Finland, Nov. 1992.

Kingsbury, P., et al., "Adding Semantic Annotation to the Penn TreeBank"; Proceedings of the Human Language Technology Conference, pp. 1-5, San Diego, CA, 2002.

Kouylekov, M., et al., "Recognizing Textual Entailment with Tree Edit Distance Algorithms," Proceedings of PASCAL Challenges Workshop on Recognising Textual Entailment, pp. 17-20, Southampton, UK, Apr. 2005.

Kundu, A., et al., "Recognition of Handwritten Script: a Hidden Markov Model Based Approach," Journal of the Pattern Recognition Society, Pergamon Press, vol. 22, No. 3, 283-297, 1989.

(56) References Cited

OTHER PUBLICATIONS

Lapata, M., "Probabilistic Text Structuring: Experiments with Sentence Ordering," Proceedings of the 41st Annual Meeting of the Association for Computational Linguistics, pp. 545-552, Jul. 2003.
Lehnert, W., et al., "UMass/Hughes: Description of the Circus System Used for MUC-5," Proceedings of the Fifth Message Understanding Conference (MUC-5), pp. 1-16, 1993.
Levin, E., et al., "Dynamic Planar Warping for Optical Character Recognition," Proceedings of the International Conference on Acoustics, Speech, and Signal Processing, vol. III, pp. 149-152, Mar. 1992.
Levit, M., "Spoken Language Understanding without Transcriptions in a Call Canter Scenario," PhD thesis, 249 pages, Logos Verlag, Berlin, Germany, 2005.
Makhoul, J., et al., "Vector Quantization in Speech Coding," Proceedings of IEEE, vol. 73, No. 11, pp. 1551-1588, Nov. 1985.
Marcus, M.P., et al., "Building a Large Annotated Corpus of English: The Penn Treebank," Computational Linguistics, vol. 19, No. 2, pp. 313-330, 1993.
Miller, S., et al., "Name Tagging with Word Clusters and Discriminative Training," Proceedings of the Human Language Technology Conference and Meeting of the North American Association for Computational Linguistics, pp. 337-342, 2004.
Moldovan, D., et al., "COGEX: A Logic Prover for Question Answering," Proceedings of the Human Language Technology and North American Chapter of the Association of Computational Linguistics Conference, vol. 1, pp. 87-93, Edmonton, Canada, 2003.
Narayanan S., et al., "Question Answering Based on Semantic Structures"; Proceedings of the 20th International Conference on Computational Linguistics (COLING-2004), Geneva, Switzerland, Aug. 2004.
Nguyen, L., et al., "The 1994 BBN/BYBLOS Speech Recognition System," Proceedings of the ARPA Spoken Language Systems Technology Workshop, Morgan Kaufmann Publishers, pp. 77-81, Jan. 1995.
Nigam, K., et al., "Text Classification from Labeled and Unlabeled Documents using EM, " Machine Learning, vol. 39, Issue 2-3, pp. 103-134, 2000.
Pang, B., et al., "Syntax-Based Alignment of Multiple Translations: Extracting Paraphrases and Generating New Sentences," Proceedings of the Human Language Technology and North American Chapter of the Association of Computational Linguistics Conference, pp. 102-109, Edmonton, Canada, 2003.
Park, H.-S., et al., "Off-line Recognition of Large-set Handwritten Characters with Multiple Hidden Markov Models," Pattern Recognition, vol. 29, No. 2, pp. 231-244, Elsevier Science Ltd, Great Britain, 1996.
Patten, T., et al., "Description of the TASC System Used for MUC-7," Proceedings of the 7th Message Understanding Conference (MUC-7), pp. 1-5, Fairfax, VA, 1998. Available at: http://www.itl.nist.gov/iaui/894.02/related_projects/muc/proceedings/muc_7_proceedings/tasc_muc7.pdf.
Pereira, F.C.N., et al., "Prolog and Natural-Language Analysis," Microtome Publishing, 204 pages, 2002.
Phillips, I.T., et al., "CD-ROM document database standard," Proceedings of the 2nd International Conference Document Analysis and Recognition, Tsukuba Science City, Japan, pp. 478-483, 1993.
Quirk, C., et al., "Dependency Treelet Translation: Syntactically Informed Phrasal SMT," Proceedings from the 43rd Annual Meeting of the Association for Computational Linguistics, pp. 271-279, Jun. 2005.
Rabiner, L., "A Tutorial on Hidden Markov Models and Selected Applications in Speech Recognition," Proceedings of the IEEE, vol. 77, No. 2, pp. 257-286, Feb. 1989.
Radev, D.R., et al., "Generating Natural Language Summaries from Multiple On-line Sources", Computational Linguistics, vol. 24, No. 3, pp. 469-500, 1998.
Ramshaw, L., et al., "Experiments in Multi-Modal Automatic Content Extraction," Proceedings of the 1st International Conference on Human Language Technology Research, pp. 1-4, San Diego, CA, 2001.
Ramshaw, "Statistical Models for Information Extraction", JHU Summer School on Human Language Technology, Jun. 2004.
Riloff, E., "Automatically Generating Extraction Patterns from Untagged Text," Proceedings of the 13th National Conference on Artificial Intelligence (AAAI-96), pp. 1044-1049.
Sekine. S., "Named Entity: History and Future," Proteus Project Report, 2004.
Shwartz, R., "A Comparison of Several Approximate Algorithms for Finding Multiple (N-BEST) Sentence Hypotheses," Proceedings of the IEEE International Conference on Acoustics, Speech and Signal Processing (ICASSP), vol. 1, pp. 701-704, May 1993.
Schwartz, R.M., et al., "Improved Hidden Markov Modeling of Phonemes for Continuous Speech Recognition," Proceedings of the ICASSP, vol. 9, pp. 21-24, 1984.
Shinyama, Y., et al., "Named Entity Discovery Using Comparable News Articles," Proceedings of the International Conference on Computational Linguistics (COLING); pp. 848-853, 2004.
Sin, et al., "A Statistical Approach with HMMs for On-Line Cursive Hangul (Korean Script) Recognition," Proceedings of the Second International Conference on Document Analysis and Recognition, pp. 147-150, Oct. 1993.
Starner, T., et al., "On-Line Cursive Handwriting Recognition Using Speech Recognition Methods," IEEE International Conference on Acoustics, Speech, and Signal Processing, vol. 5, pp. V/125-V/128, Apr. 19-22, 1994.
Stone, M., et al., "Sentence Planning as Description Using Tree Adjoining Grammar," Proceedings of the 35th Annual Meeting of the Association for Computational Linguistics, pp. 198-205, Madrid, Spain, 1997.
Sudo, K., et al., "Cross-lingual Information Extraction System Evaluation," Proceedings from the International Conference on Computational Linguistics (COLING); pp. 882-888, 2004.
Sudo, K., et al., "An Improved Extraction Pattern Representation Model for Automatic IE Pattern Acquisition" Proceedings of the 41st Annual Meeting of the Association for Computational Linguistics, pp. 2224-2231, Jul. 2003.
Thompson, et al., "Active learning for natural language parsing and information extraction", Proc. of 6th International Machine Learning Conference, Jun. 1999.
Uchimoto, K., et al. "Word Translation by Combining an Example-Based Method and Machine Learning Models" J. Natural Language Processing, vol. 10, No. 3, pp. 87-114, 2003.
Vishwanathan, S.V.N., et al., "Fast Kernels for String and Tree Matching," Neural Information Processing Systems, 8 pages, MIT Press, 2004.
Vlontzos, J.A., et al., "Hidden Markov Models for Character Recognition," IEEE Transactions on Image Processing, vol. 1, Issue 4, pp. 539-543, Oct. 1992.
Wang, J.T.-L., et al., "A System for Approximate Tree Matching," IEEE Transactions on Knowledge and Data Engineering, vol. 6, No. 4, pp. 559-571, Aug. 1994.
Wu, D., "Stochastic Inversion Transduction Grammars and Bilingual Parsing of Parallel Corpora," Association for Computational Linguistics, vol. 23, No. 3, pp. 377-403, Sep. 1997.
Yangarber, R., "Counter-Training in Discovery of Semantic Patterns," Proceedings of the 41st Annual Meeting for Computational Linguistics, pp. 343-350, Japan, 2003.
Yangarber, R., et al., "Unsupervised Learning of Generalized Names," Proceedings of the 19th International Conference on Computational Linguistics (COLING-02), pp. 1-7, 2002.
Yangarber, R., et al., "NYU: Description of the Proteus/PET System as Used for MUC-7 ST," Proceedings of the 7th Message Understanding Conference (MUC-7), pp. 1-7, 1998. Available at: http://www.itl.nist.gov/iaui/894.02/related_projects/muc/proceedings/muc_7_proceedings/nyu_st_paper.pdf.
Younger, D.H., "Recognition and Parsing of Context-Free Languages in Time $n^3$," Information and Control, vol. 10, pp. 189-208, 1967.

(56) References Cited

OTHER PUBLICATIONS

Zelenko, D., et al., "Kernel Methods for Relation Extraction," Journal of Machine Learning Research, vol. 3, pp. 1083-1106, Mar. 2003.
Zhao, S., et al., "Extracting Relations with Integrated Information Using Kernel Methods," Proceedings of the 43rd Annual Meeting of ACL, pp. 419-426, Jun. 2005.
Zhao, S., et al., "Discriminative Slot Detection Using Kernel Methods," Proceedings of the 20th International Conference on Computational Linguistics (COLING-04), pp. 1-7, Geneva, Switzerland, 2004.

Office Action issued in U.S. Appl. No. 11/411,206 on Dec. 19, 2008.
Office Action issued in U.S. Appl. No. 10/806,406 on Apr. 29, 2008.
Office Action issued in U.S. Appl. No. 10/806,406 on Sep. 5, 2007.
Office Action issued in U.S. Appl. No. 10/806,406 on Jan. 19, 2007.
Office Action issued in U.S. Appl. No. 11/411,206 on Aug. 13, 2009.
Office Action issued in U.S. Appl. No. 11/974,022 on Nov. 24, 2009.
Office Action issued in U.S. Appl. No. 11/974,022 on Jun. 10, 2010.
Office Action issued in U.S. Appl. No. 13/012,225 on Sep. 29, 2011.
Office Action issued in U.S. Appl. No. 11/998,663 on May 11, 2011.

* cited by examiner

METHODS AND SYSTEMS FOR REPRESENTING, USING AND DISPLAYING TIME-VARYING INFORMATION ON THE SEMANTIC WEB

RELATED APPLICATIONS

This application is a continuation of copending, commonly assigned U.S. patent application Ser. No. 10/806,406, filed on Mar. 23, 2004, which claims priority to U.S. Provisional Patent Application No. 60/465,925, filed on Apr. 28, 2003. Both of these applications are incorporated by reference herein in their entirety. This application is co-pending with a related patent application entitled "Methods and Apparatus for Focusing Search Results on the Semantic Web" Ser. No. 10/803,551, by the same inventor and having assignee in common, filed concurrently herewith and incorporated by reference herein in its entirety.

GOVERNMENT INTEREST

The United States Government has a paid-up license in this invention and the right in limited circumstances to require the patent owner to license to others on reasonable terms as provided for by the terms of Contract No. F30602-00-C-0178 awarded by the Defense Advanced Research Projects Agency.

FIELD

The methods and systems relate to representing, using and displaying information, and more particularly to methods and systems for representing, using and displaying time-varying information on the Semantic Web.

BACKGROUND

The Semantic Web is an evolving collection of software tools and content, which provides information on the Internet, or World Wide Web, in such a way that it can be readily used by intelligent agents and other computer programs. Information on the Semantic Web, rather than being in natural language text, can be maintained in a structure workable by both computers and people. The Resource Description Framework (RDF) from the World Wide Web Consortium (W3C) underlies most Semantic Web efforts. RDF consists of statements (subject-predicate-object triples) made about instances of specific classes (similar to an object-oriented programming language).

The Resource Description Framework (RDF) is a general framework for how to describe an Internet resource such as a Web site and its content. An Internet resource is defined herein as a resource with a Uniform Resource Identifier (URI), including the Uniform Resource Locators (URLs) that identify Web sites as well as specific Web pages. Resources can also be physical objects (such as people) represented on Web pages. As with known HyperText Markup Language (HTML) META tags, the RDF description statements, encased as part of an Extensible Markup Language (XML) section, can be included within a Web page (HTML file), or can be in separate files.

RDF description statements can be represented as graphs containing nodes (instances or string literals) and arcs (statements). FIG. 6A provides an example of such a graph for an RDF statement of the form, "Mike Thornton has a father Joe Thornton." For this RDF statement, "Mike Thornton" is the subject, "father" is the predicate, and "Joe Thornton" is the object. In the exemplary diagram, or graph of FIG. 6A, the ovals can illustrate nodes representing resources (ovals 2 and 4), and arcs can represent the named property, as shown by arc 6. The direction of the arc can be from subject (2) to object (4). It can be understood that other representations besides the illustrated ovals and directional arcs can be used.

FIG. 6B illustrates a graph of a collection of statements in which "Mike Thornton" (using an abbreviated form to represent a full URI) can be both the subject and object of various ones of the statements, including, "Jason Thornton has a father Mike Thornton," and "Mike Thornton is married to Nancy Frier." The subject "Jason Thornton" is represented by oval 8 and predicate "father" is represented by arc 10 from subject "Jason Thornton" (oval 8) to object "Mike Thornton" (oval 2). The object "Nancy Frier" is represented by oval 12 and predicate "married to" is represented by arc 14 from subject "Mike. Thornton" (oval 2) to object "Nancy Frier" (oval 12).

While such graphs as illustrated in FIGS. 6A and 6B can pictorially present the properties of subjects and objects, they can do so in a static fashion. For example, FIG. 6C can illustrate an extended graph for statements concerning "Mike Thornton" taken from a genealogical resource. In addition to the statements in FIG. 6R, FIG. 6C can include the statements shown in Table 1.

| Statement | Subject (Identifier) | Predicate (Identifier) | Object (Identifier) |
| --- | --- | --- | --- |
| Mike Thornton has a mother Louise Hensley | Mike Thornton (2) | mother (16) | Louise Hensley (18) |
| Noah Thornton has a father Mike Thornton | Noah Thornton (22) | father (24) | Mike Thornton (2) |
| Jason Thornton has a mother Nancy Frier | Jason Thornton (8) | mother (20) | Nancy Frier (12) |
| Noah Thornton has a mother Nancy Frier | Noah Thornton (22) | mother (26) | Nancy Frier (12) |
| Joe Thornton is married to Louise Hensley | Joe Thornton (4) | married to (28) | Louise Hensley (18) |

It can be seen that Mike Thornton is neither the subject nor object of the last three statements in Table 1. However, these statements can be included in the graphical representation as having both subjects and objects in common with statements concerning "Mike Thornton."

Without additional statements providing dates for such events as births, deaths, or marriages, a user cannot determine time varying information from the graphs of FIGS. 6A-C. For example, one cannot assess whether Noah is older or younger than Jason, or the relative ages of other individuals shown. Other time varying information, such as multiple marriages, can also present difficulties for the representations of FIGS. 6A-C. Methods and systems are needed for determining and graphically representing such information from Semantic Web structured resources to a user.

SUMMARY

The methods and systems described herein can include providing start and stop time properties to Semantic Web structured resources and statements. The start and stop time properties can specify a lifetime during which a resource or statement can be valid. A call or query to one or more resources can return statement data including the start and stop properties for the subjects and objects of the statements, and/or the statements themselves. Dates can be specified with the call or query such that the returned statements have lifetimes that include the specified dates. The specified dates can be used by a filter after obtaining the data for the query. Screen images of the data can display subject and object nodes and predicate arcs for the statement data. A sequence of screen images can display a timeline of nodes and arcs by adding or hiding nodes and arcs to correspond with the start and stop properties of the statements and nodes. Tools can be provided for the user to navigate through the sequence.

In one embodiment, a method of displaying Semantic Web statements having start properties and stop properties related to lifetimes of the statements includes displaying subjects and objects of the statements as nodes, displaying predicates of the statements as arcs connecting the nodes and labeled by the predicates, and hiding the nodes and arcs for subjects, objects, and statements having lifetimes outside of a timeframe selected by a user. Hiding can comprise painting the nodes and arcs of those statements to match a background of the display. One aspect of the embodiment includes providing tools by which the user can select the timeframe. The user can be given options to select a start timeframe corresponding to an earliest one of the start properties of the statements, to select an end timeframe corresponding to a latest one of the start properties of the statements, and/or to select a timeframe increment for displaying the statements in temporal order corresponding to the start properties and the stop properties of the statements. Nodes can be labeled with their URI's or with the value of a literal property, such as a name, which may itself vary over time based on the start and stop time properties of statements using that property.

In one embodiment, a system for displaying graphical representations of time varying information for Semantic Web structured statements includes a processor connected to Semantic Web structured resources and receiving input from a user, including a query to retrieve selected statements matching the query. Application program interfaces (APIs) determine the selected statements from the resource and obtain the start and stop properties for subjects and objects of the matching statements and for the statements themselves. The APIs also determine graphical representation data from the selected statements and their properties. The processor receives the graphical representation data and control a display to present the graphical representations of the selected statements. The processor controls the display to hide graphical representations of those statements whose lifetime does not include a timeframe input by the user. The system include an application tool set operable by the user to input the timeframe, wherein the user can select timeframe increments corresponding to the start and stop properties of the selected statements.

In one embodiment, a method of displaying graphical representations of time varying information for Semantic Web structured statements from Semantic Web resources includes receiving a query to retrieve selected statements that match a query, determining the selected statements from the Semantic Web structured resources, obtaining start and stop properties for subjects and objects of the selected statements and for the statements themselves, determining graphical representation data for the selected statements and the properties, filtering the graphical representation data to control a display to present graphical representations of the statements, and controlling the display to hide the graphical representations of those statements whose lifetimes exclude a selected timeframe.

In one embodiment, a computer-readable medium includes instructions for controlling a processor to associate a lifetime with a Semantic Web structured statement by implementing a start property for the statement that denotes a start time when the statement becomes valid, and implementing a stop property for the statement that denotes a stop time when the statement ceases to be valid, wherein the lifetime of the statement is denoted by a time interval between the start time and the stop time. The start property and the stop property can be implemented as an XML Schema Datatype, including an xsd:dateTime datatype, an xsd:date datatype and/or a xsd:gYear datatype.

The instructions include instructions for controlling a processor to display a plurality of statements on a display by displaying subjects and objects of the statements as nodes, displaying predicates of the statements as arcs connecting the nodes, and hiding nodes and arcs for particular statements when a selected display timeframe is outside the lifetimes of those particular statements. The instructions include instructions for controlling a processor to hide the nodes and arcs by painting the nodes and arcs for those particular statements to match a background of the display.

The instructions include instructions for controlling a processor to display a toolset operable by a user to select said timeframe. The toolset can be operable by the user to select a start timeframe corresponding to an earliest one of said start properties of said statements, to select an end timeframe corresponding to a latest one of said stop properties of said statements, and/or to select timeframe increments for displaying the statements in temporal order corresponding to their start properties and stop properties.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
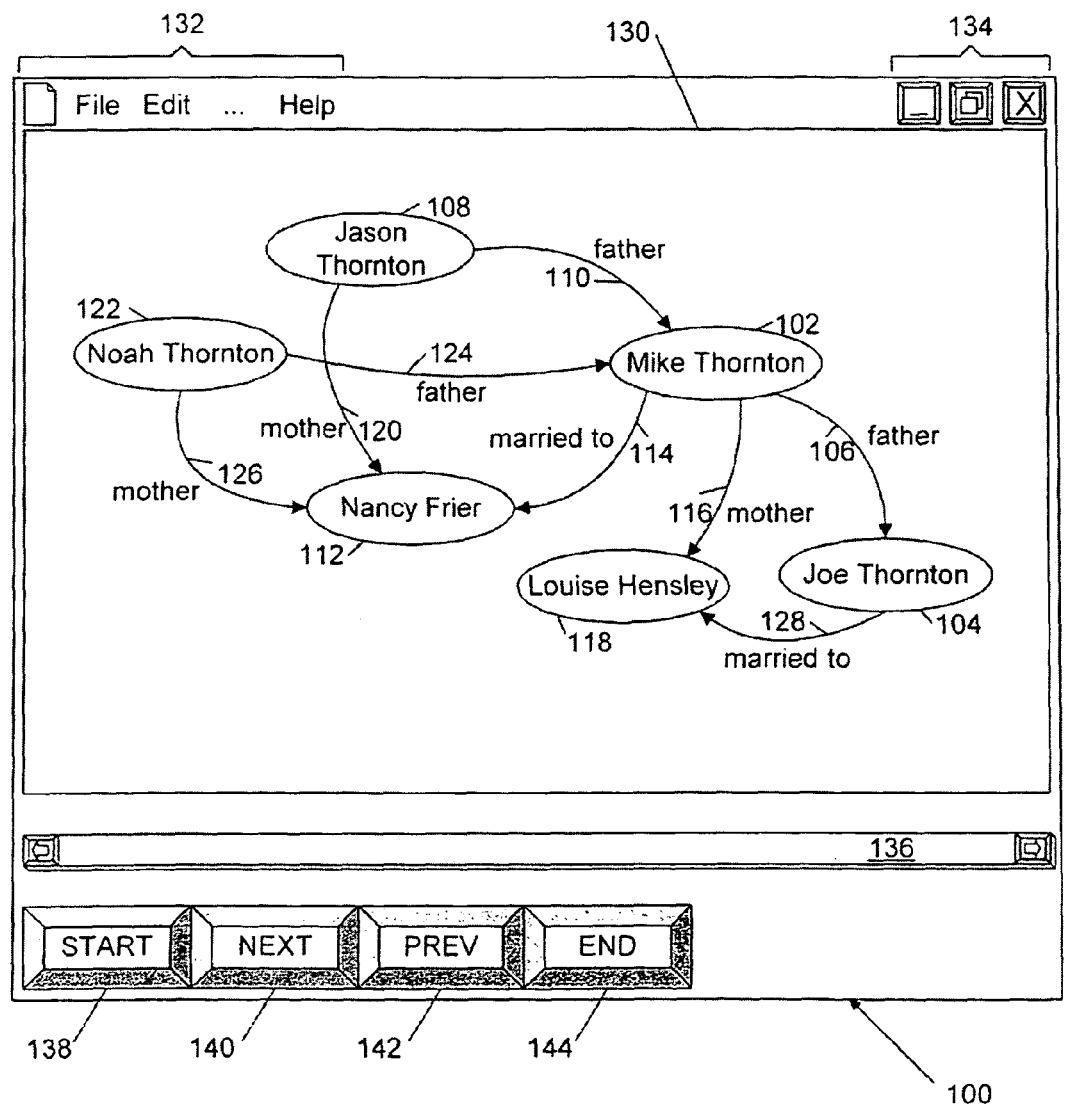
FIG. 1 illustrates a screen image of a graphical representation of statements taken from a Semantic Web resource.
Figure 6A:
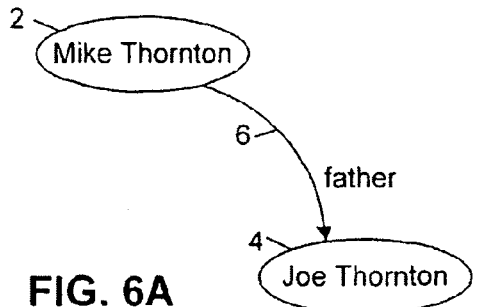
FIGS. 6A-6C illustrate prior art graphical representations of statements from Semantic Web structured resources.
Figure 6B:
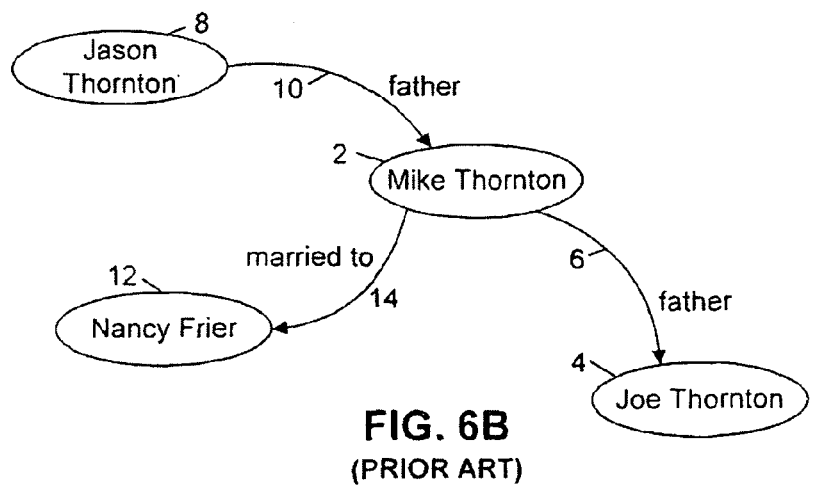
Figure 6C:
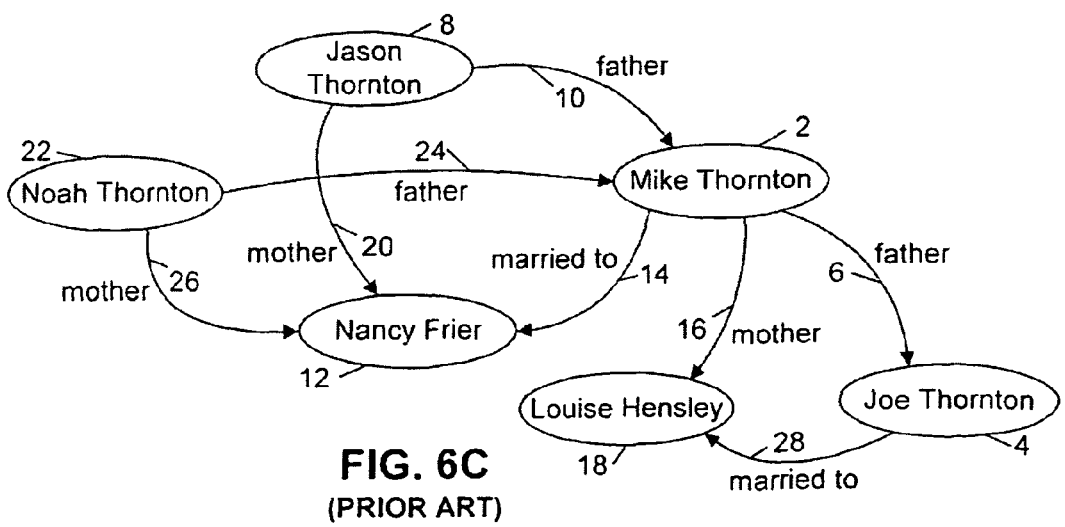

FIG. 1 shows a screen image of a graphical representation of RDF statements from a Semantic Web resource. For simplicity, the graphical representation of FIG. 1 can include the statements from the genealogical resource as in FIG. 6C. The elements in FIG. 1 having numbering offset by 100 from those of FIG. 6C refer to corresponding elements of the statements described with respect to FIG. 6C. It can be understood that the numbering of elements in FIG. 1 and other figures described further herein, is shown for ease in describing the features of the graphical representations and need not be viewable by a user.

In addition to the subject, predicate and object for each statement, the RDF statements and Semantic Web resources for use with the methods and systems described herein can have associated start and stop properties. The time interval starting with a specified start time and before a specified stop time can be referred to as the lifetime of the statement or resource. Closed lifetimes include lifetimes having both start and stop times specified. Open-ended lifetimes include those having one of the start or stop times specified. Infinite lifetimes include those having neither a start or stop time specified.

The Resource Description Framework (RDF) from the World Wide Web Consortium (W3C) can underlie most Semantic Web efforts. While implementation of the start and stop properties can include various known protocols or datatypes for providing and communicating such properties among resources and applications, the use of standardized protocols, properties, and datatypes can be preferred so as to provide for wide use of the methods and systems described herein. Thus, in one embodiment, the start and stop properties can make use of the xsd:dateTime datatype from the W3C XML Schema Datatypes Recommendation, though other datatypes, e.g., xsd:date orxsd:gYear, can be used.

If multiple time intervals are associated with a given statement or resource (instance), e.g., a marriage relation between two people who divorce and then remarry each other, then instances of the class Interval can be used to group start/stop intervals. Thus, rather than having start and stop properties associated directly with the object or statement, the statement can have multiple Interval instances, which each can have its own start and stop properties.

Figure 5A:
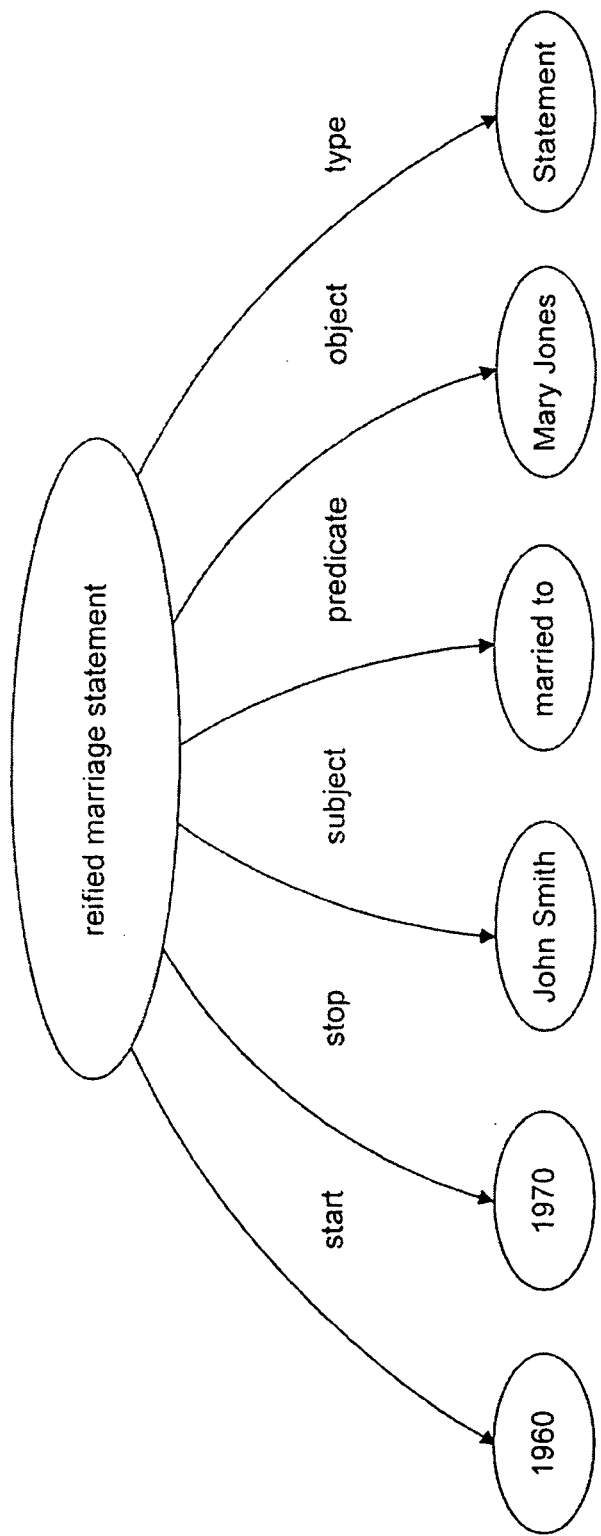
FIG. 5A illustrates a statement associated directly with start and stop properties.
Figure 5B:
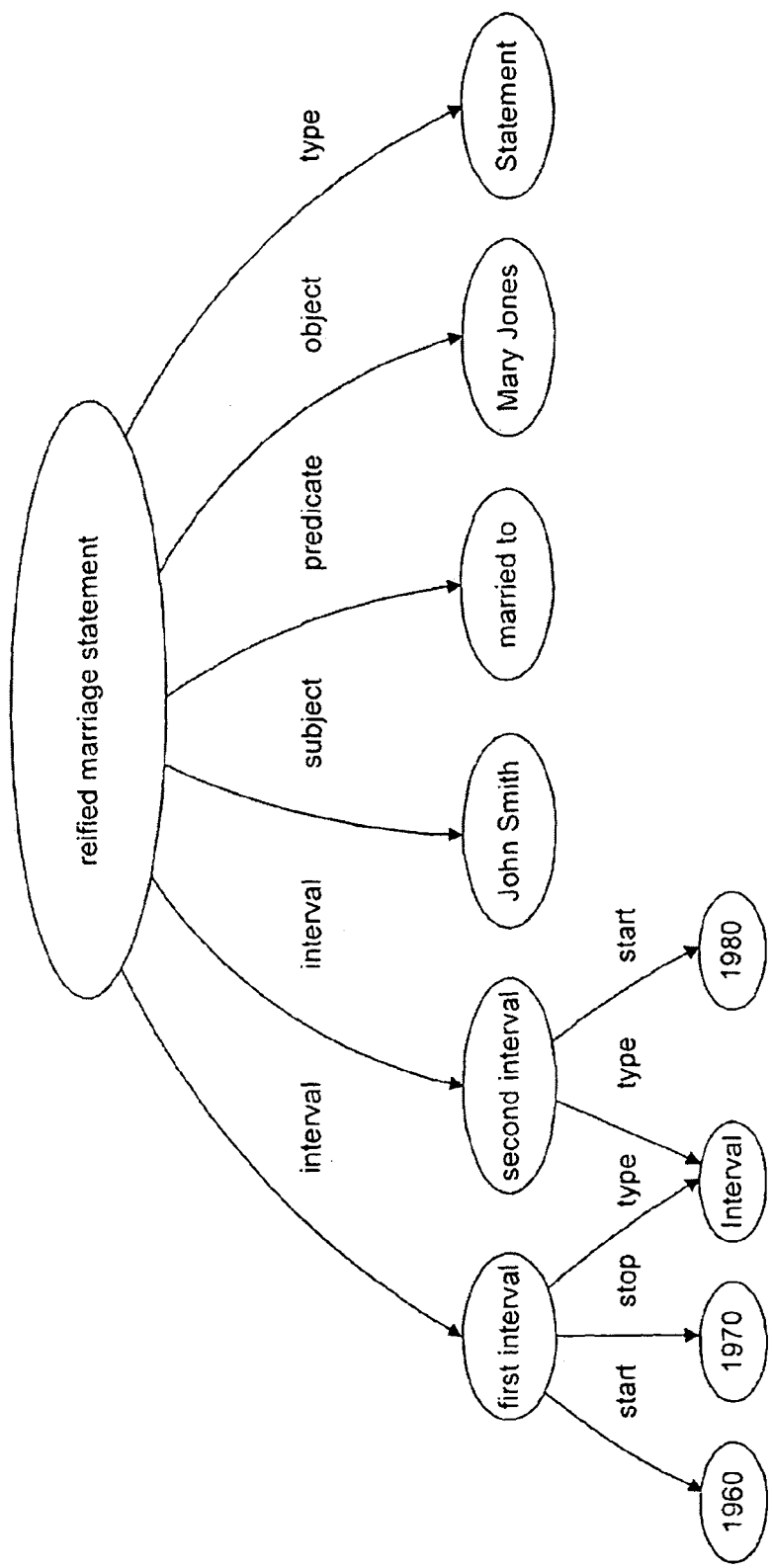
FIG. 5B illustrates a statement having multiple Interval instances.
Figure 5C:
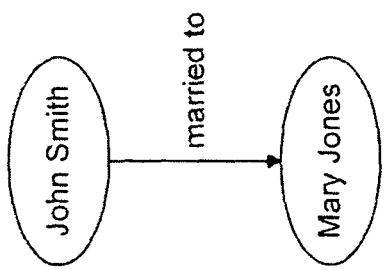
FIG. 5C illustrates a reified version of a statement.

FIG. 5A illustrates an example of statement 502 (a reified version of statement is shown in FIG. 5C) having start property 504 and stop property 506 directly associated with statement 502. FIG. 5B illustrates the example of FIG. 5A, wherein statement 502 has multiple instances 508, 510 of the class Interval 512. Instance 508, with respective start and stop properties 504 and 506, corresponds with the interval for statement 502 of FIG. 5A, while instance 510 shows the addition to statement 502 of a second interval with start property 514. For the marriage relation example discussed above, the first interval 508 of the marriage can indicate the marriage (statement 502) began in 1960 (start property 504) and ended in 1970 (stop property 506). The second interval 510 can indicate that the same marriage, i.e., marriage between the same two people, began again in 1980 (start property 514). Intervals can be associated with instances as well as with statements.

In addition to its start and stop properties, the lifetime of a statement can also be constrained by the lifetimes of resources that it can reference as a subject or object. For example, a marriage relation ends when one of the participants dies.

Start and stop properties will typically be associated with statements by using RDF statementIDs. The use of RDF statementIDs can result in both asserted and reified statements. The technique can be equally applied to content involving only reified statements. When applied to such content, the graph structure for each reified statement can be constructed explicitly without the use of statement IDs.

Figure 2A:
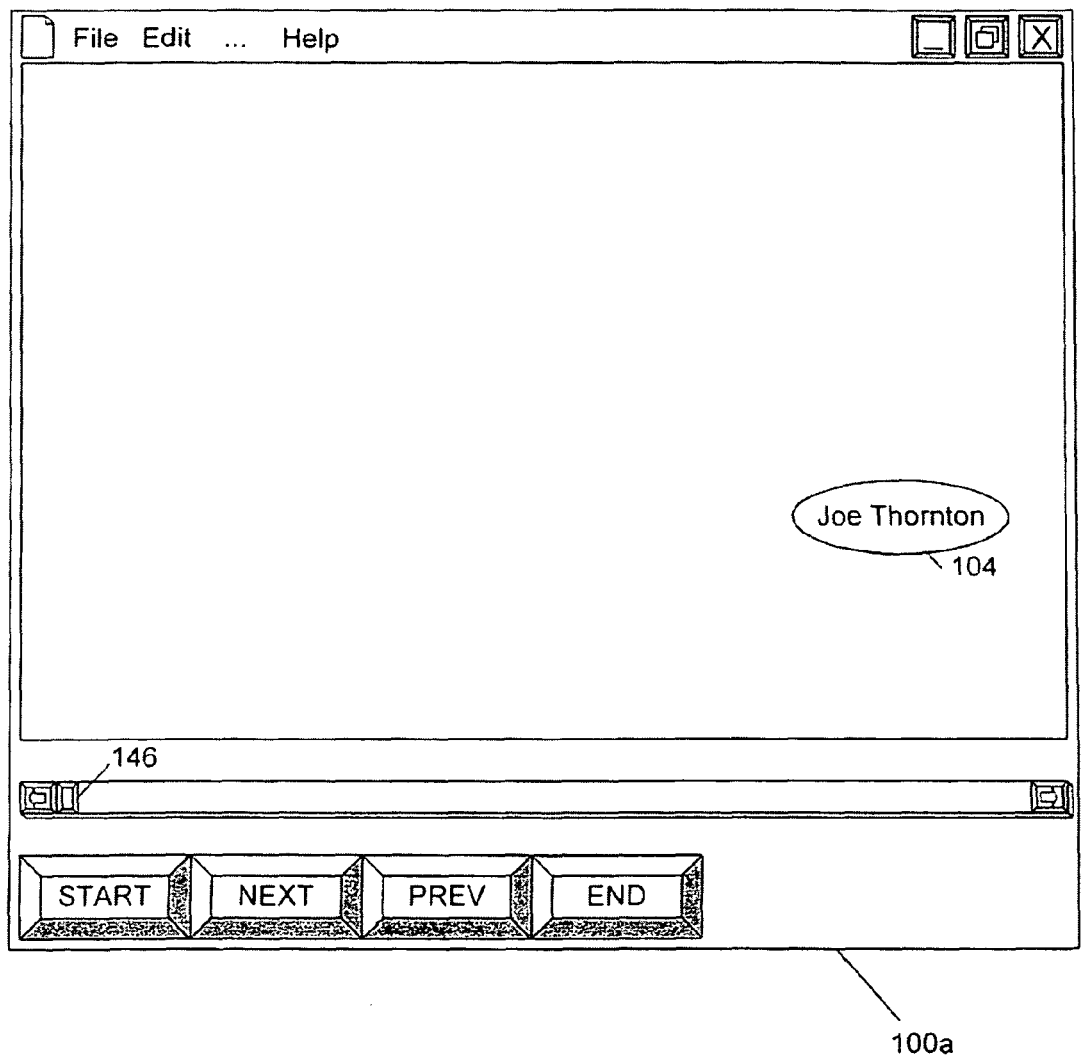
FIGS. 2A-2I illustrate time varying graphical representations of the statements of FIG. 1.
Figure 2B:
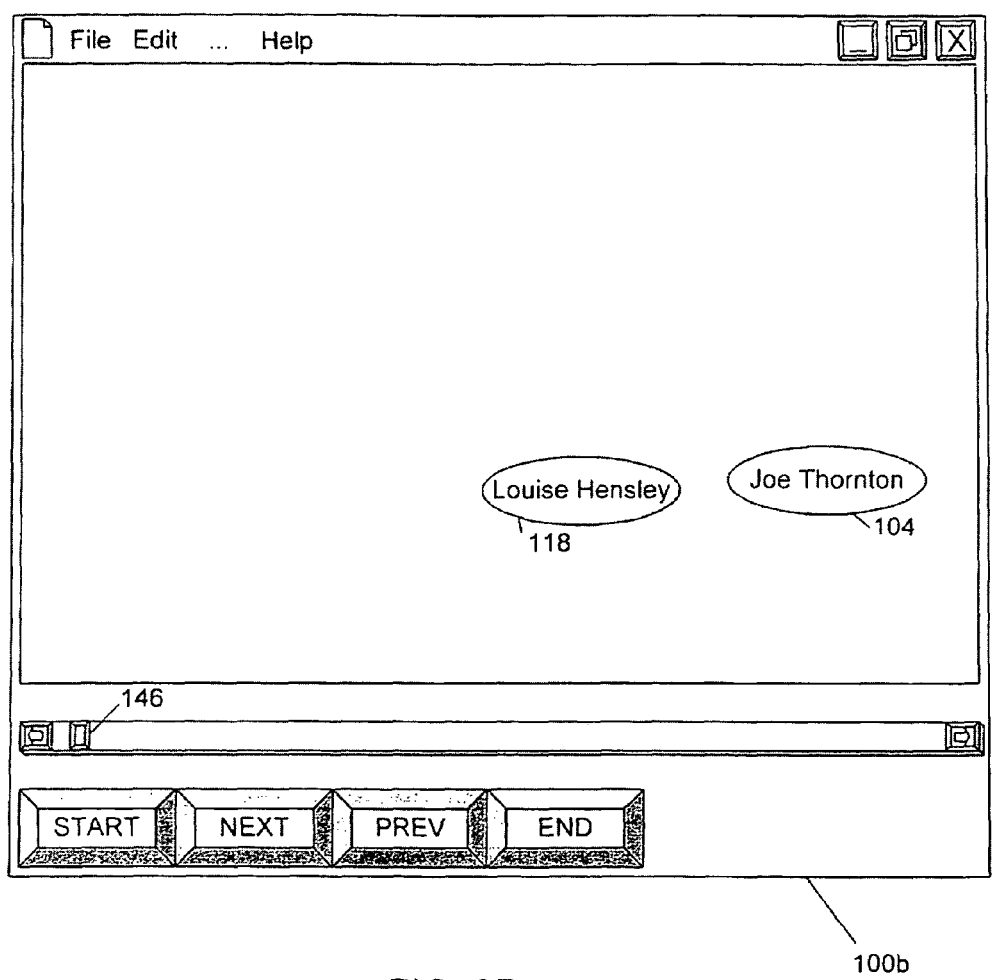
Figure 2C:
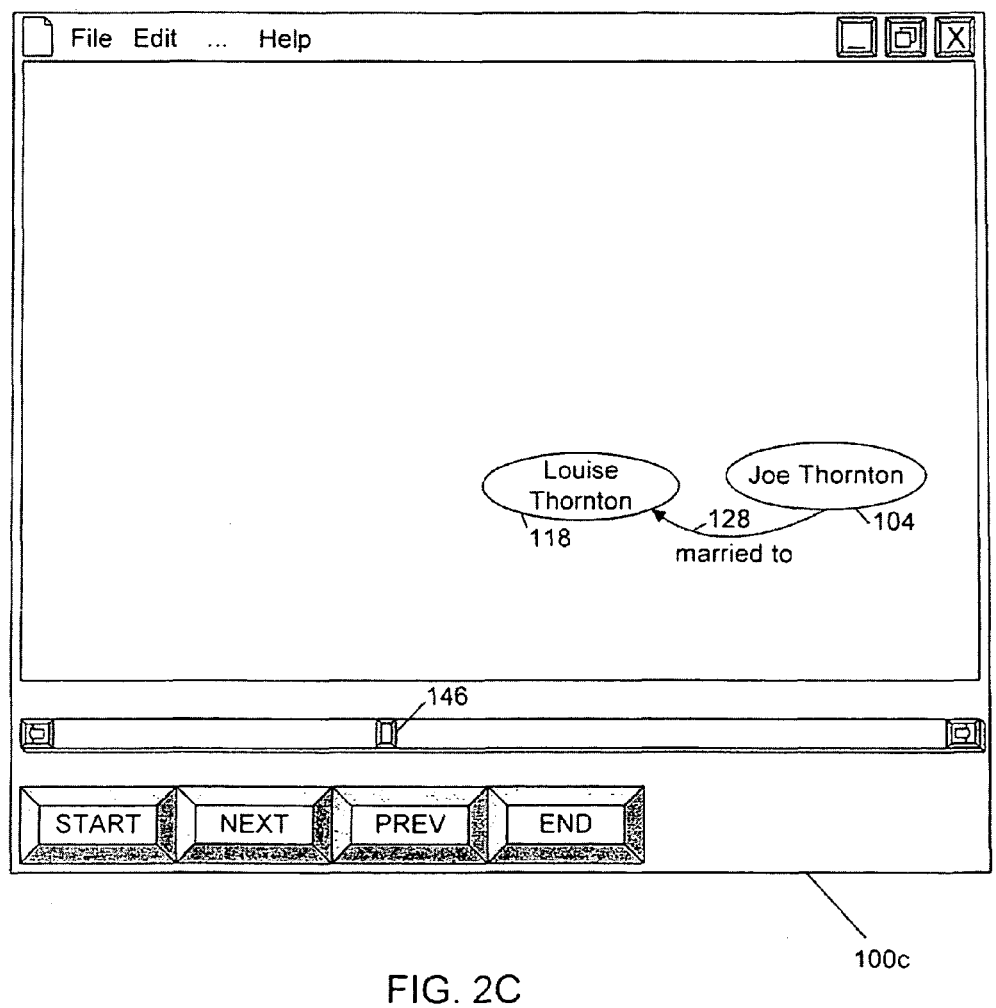
Figure 2D:
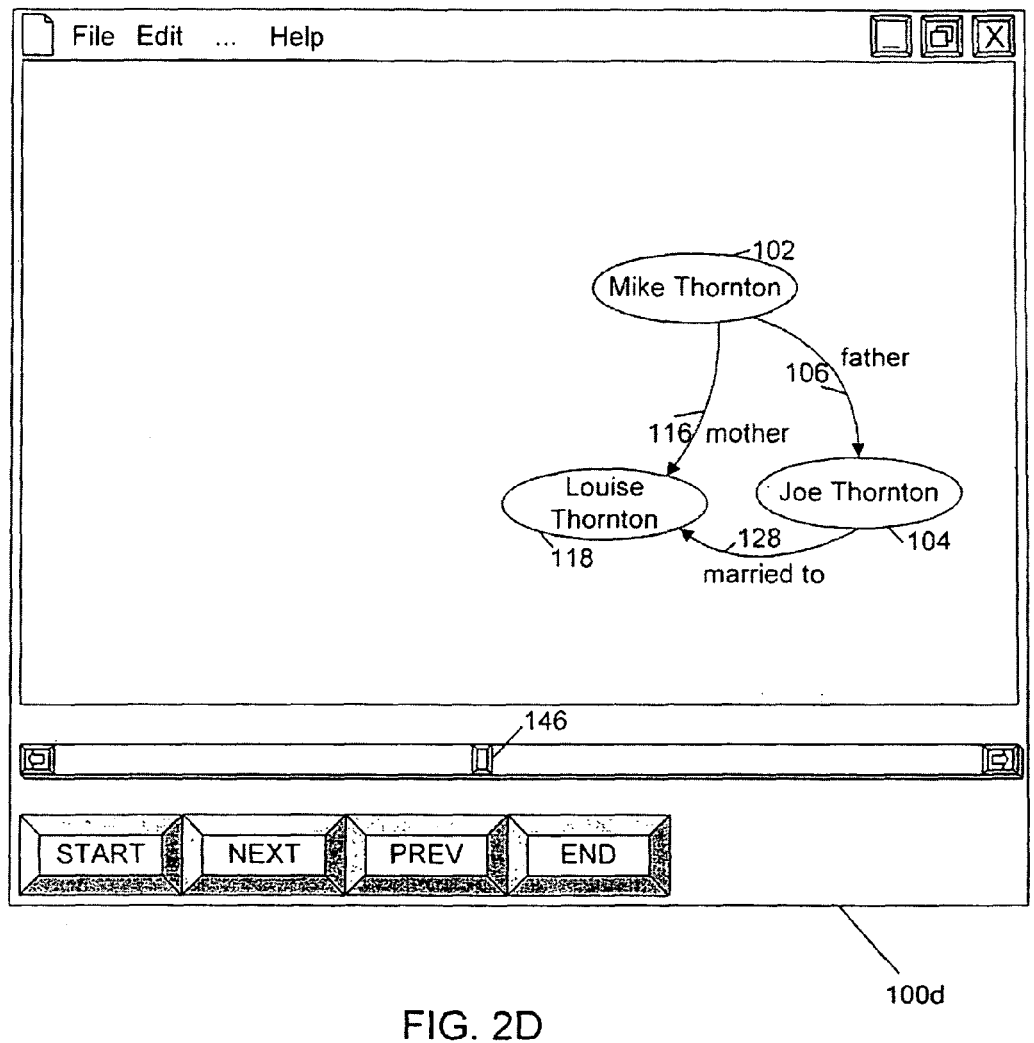
Figure 2E:
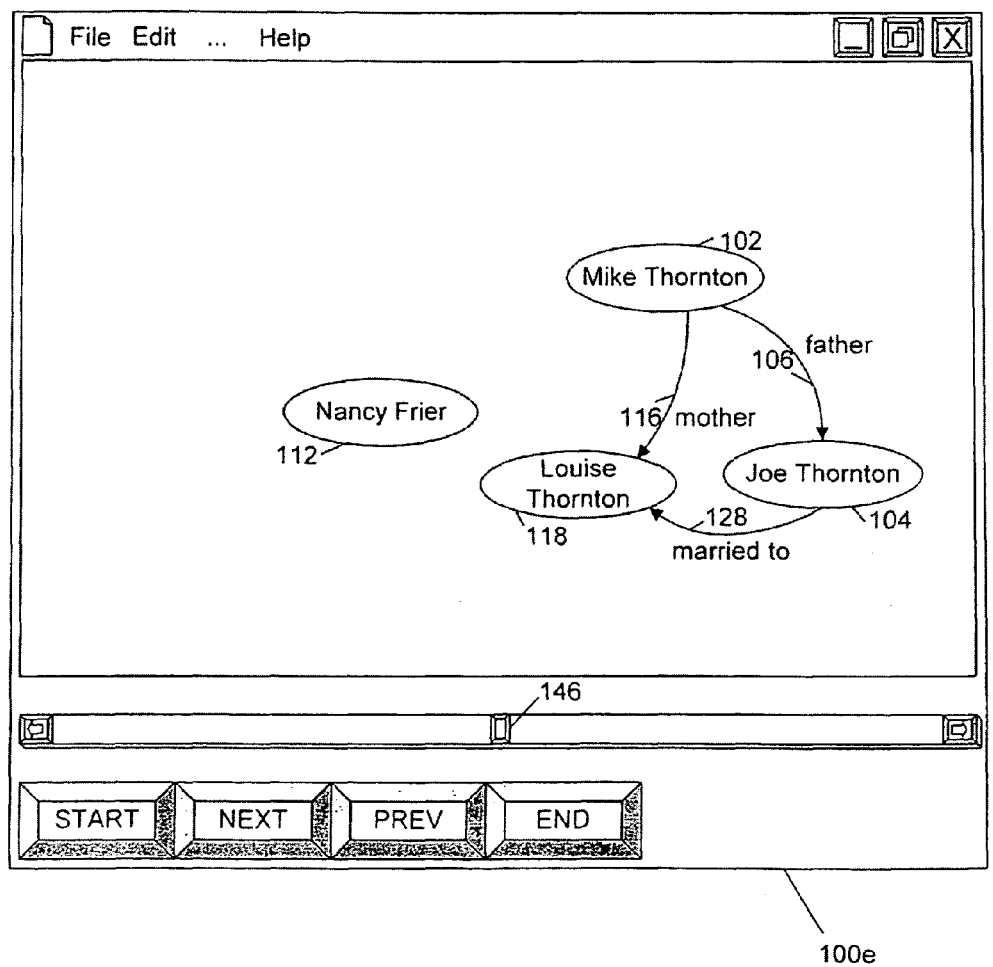
Figure 2F:
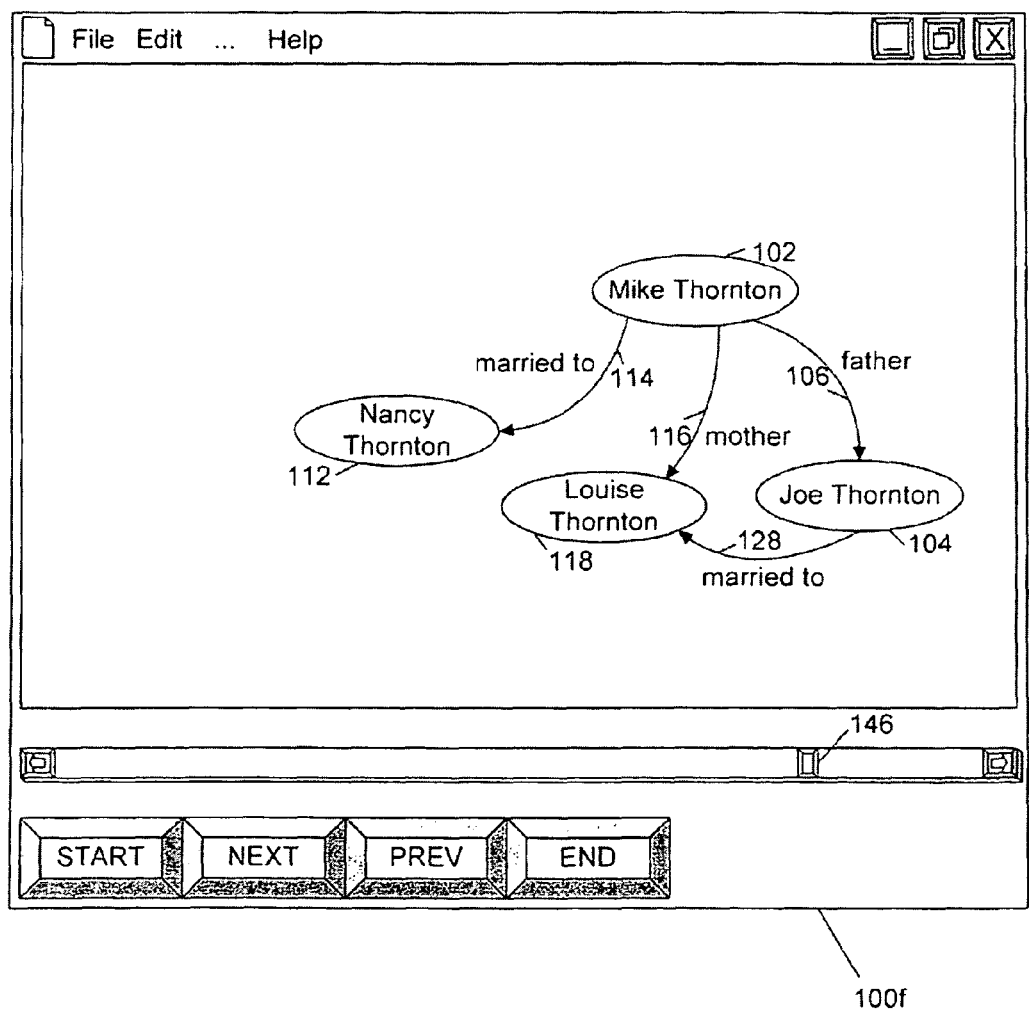
Figure 2G:
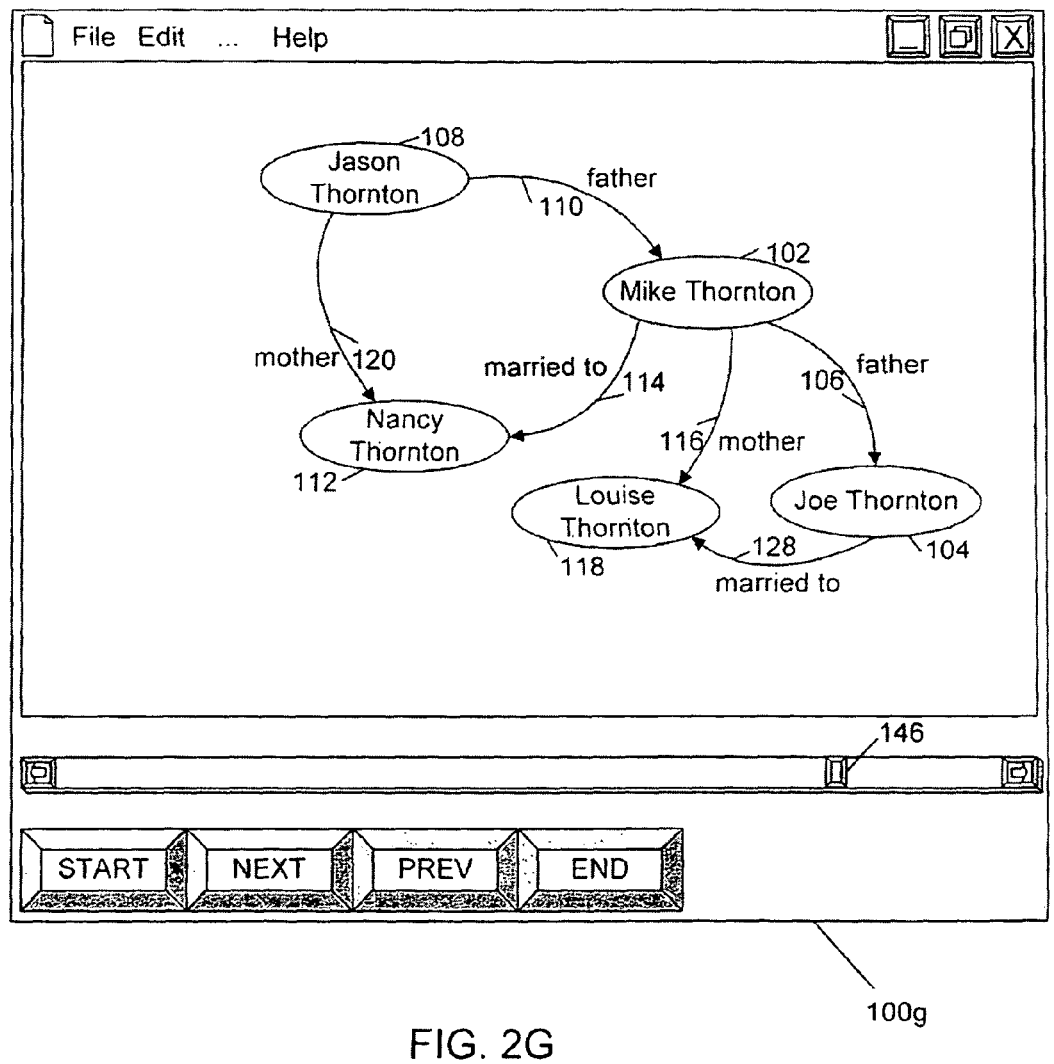
Figure 2H:
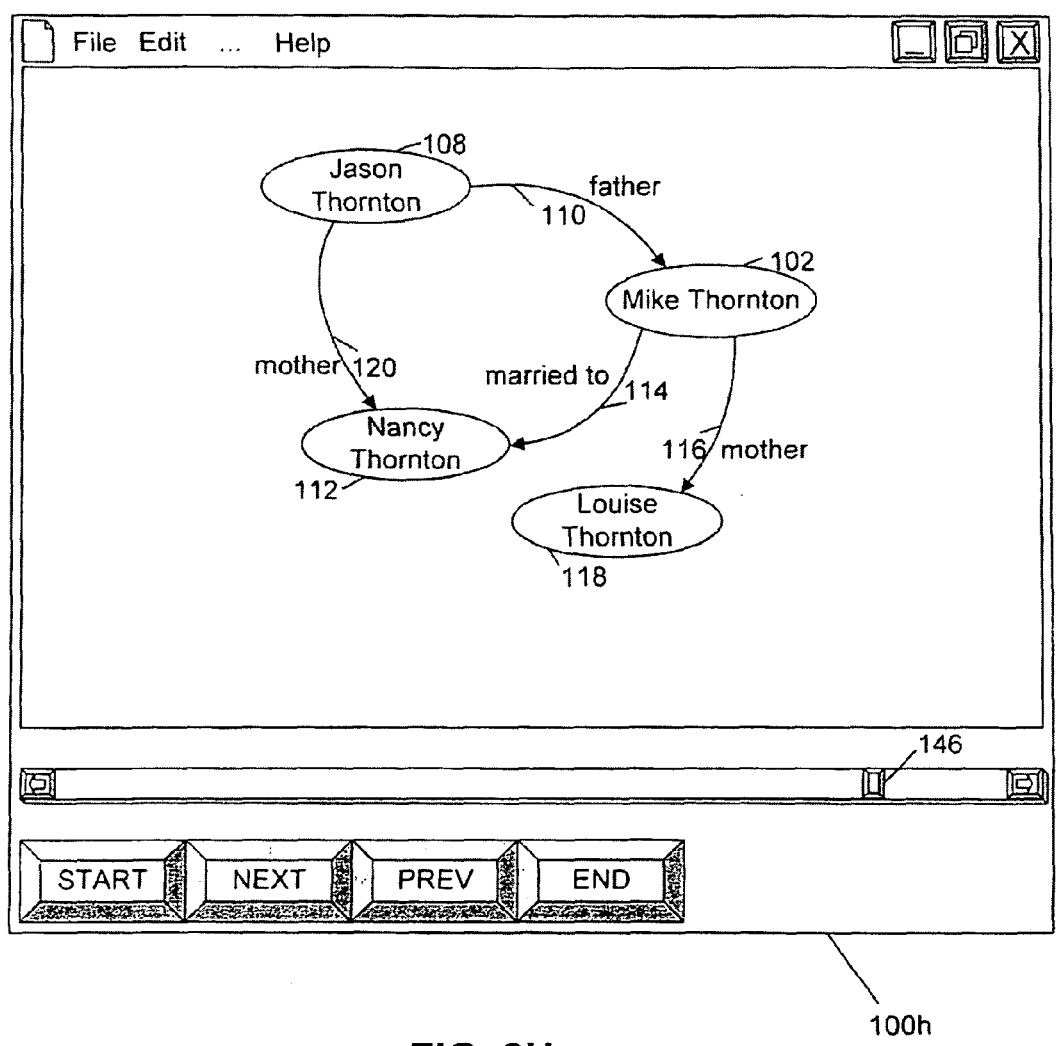
Figure 2I:
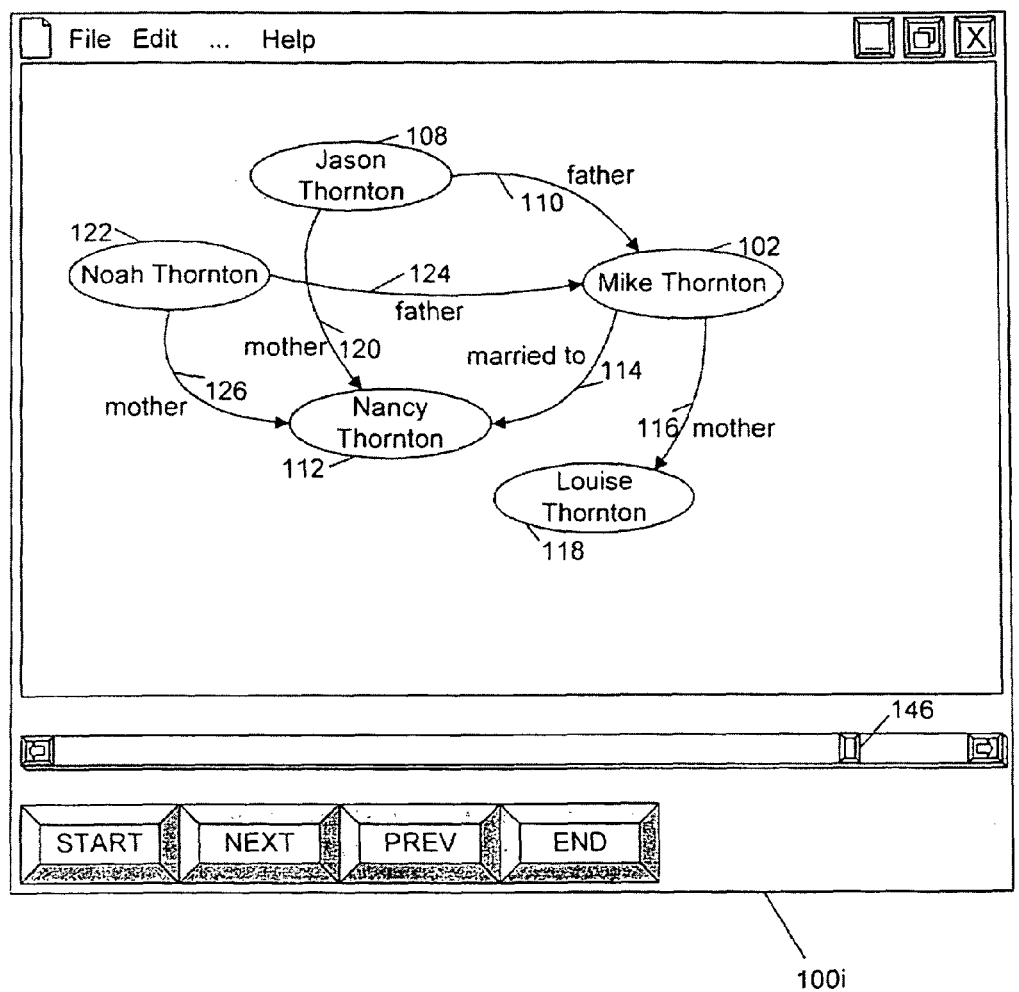
Figure 3:
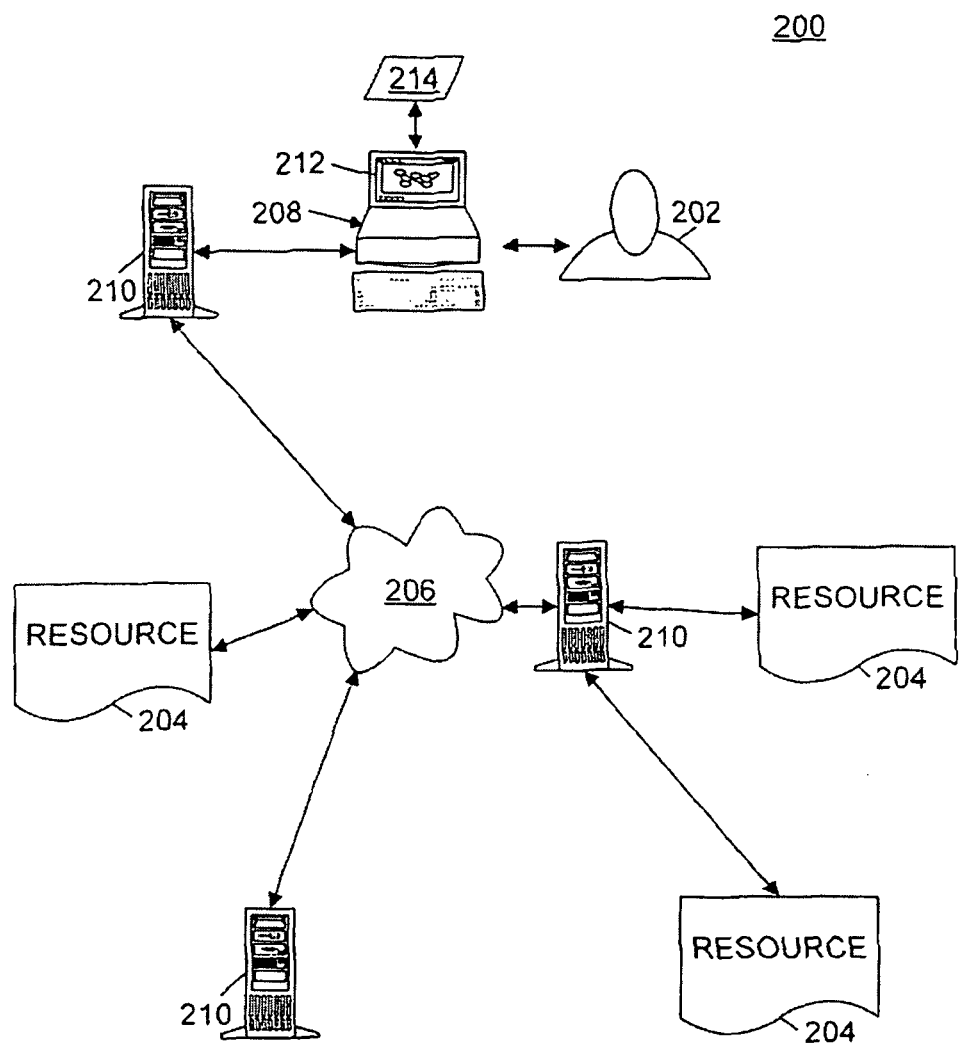
FIG. 3 illustrates a system for providing time varying graphical representations of statements from a Semantic Web resource.
Figure 4:
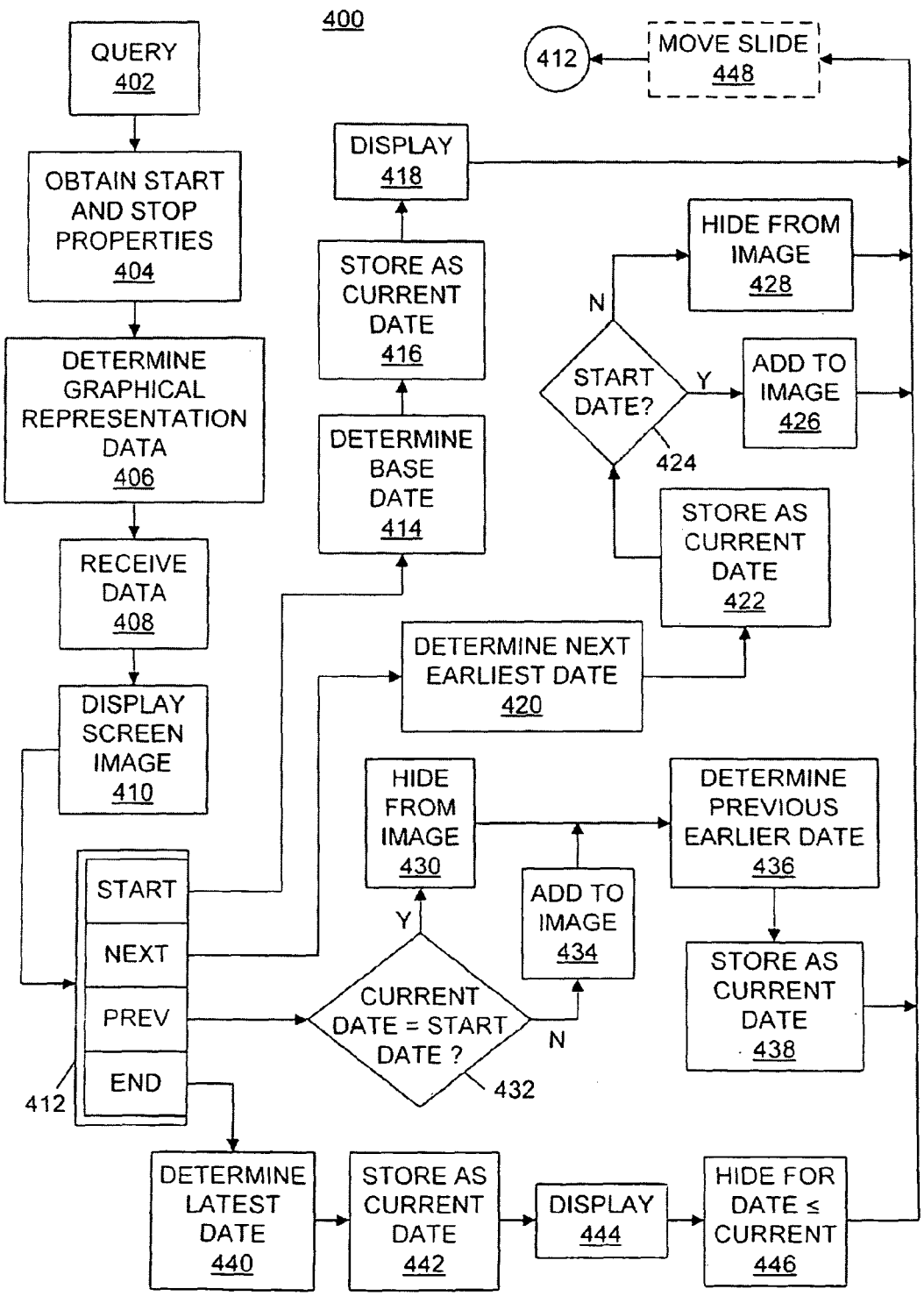
FIG. 4 illustrates allow chart of a method of implementing time varying graphical representations of statements from a Semantic Web resource.

The screen images of FIGS. 1 and 2A-I can be described with relation to the systems 200 and method 400 of FIGS. 3 and 4, respectively. FIG. 3 illustrates an exemplary system 200 for presenting time-varying information to a user 202 from one or more Semantic Web structured resources 204. User 202 can connect to network 206 via processor 208. One or more servers 210 can facilitate connections to network 206 by user 202 and resources 204, though it can be understood that processor 208 and/or resources 204 can be configured for direct connection to network 206. Processor 208 can include a display 212 by which screen images, such as screen image 100 of FIG. 1 and the screen images of FIGS. 2A-I can be viewed by the user 202.

FIG. 4 is a flow chart for a method 400 of implementing time varying graphical representations of statements from a semantic web resource. User 202 of FIG. 3 can query (402) one or more Semantic Web structured resources, such as resources 204 of FIG. 3, using. Application Program Interfaces (APIs) 214. As previously described with respect to FIGS. 6A-C, APIs for Semantic Web languages can include models containing sets of RDF Statements, as well as graphical representations linking resources and statements. In addition, the APIs 214 of FIG. 3 for the systems and methods described herein can include obtaining the start and stop properties for the statements and resources selected by the user 202 and using the start and stop properties in displaying time varying graphical representation to user 202. While the APIs 214 are shown in FIG. 3 as directly accessible, or as part of processor 208, it can be understood that servers 210 and/or resources 204 can include APIs 214, or that APIs 214 can be distributed among one or more servers 210; and/or resources 204.

Table 2 shows exemplary stop and start properties for the subjects, objects, and statements of FIG. 1.

TABLE 2

| Statement | Subject (Identifier) Start Stop | Predicate (Identifier) | Object (Identifier) Start Stop | Start | Stop |
|---|---|---|---|---|---|
| 1. Mike Thornton has a father Joe Thornton | Mike Thornton (102) May 29, 1957 — | father (106) | Joe Thornton (104) Mar. 16, 1928 Jun. 14, 1992 | May 29, 1957 | Jun. 14, 1992 |
| 2. Jason Thornton has a father Mike Thornton | Jason Thornton (108) Aug. 05, 1987 — | father (110) | Mike Thornton (102) May 29, 1957 — | Aug. 05, 1987 | — |
| 3. Mike Thornton is married to Nancy Frier | Mike Thornton (102) May 29, 1957 — | married to (114) | Nancy Frier (112) Aug. 19, 1958 — | Nov. 02, 1982 | — |
| 4. Mike Thorton has a mother Louise Thornton | Mike Thornton (102) May 29, 1957 — | mother (116) | Louise Hensley (118) Nov. 04, 1929 — | May 29, 1957 | — |
| 5. Noah Thornton has a father Mike Thornton | Noah Thornton (122) Feb. 15, 1994 — | father (124) | Mike Thornton (102) May 29, 1957 — | Feb. 15, 1994 | — |
| 6. Jason Thornton has a mother Nancy Frier | Jason Thornton (108) Aug. 05, 1987 — | mother (120) | Nancy Frier (112) Aug. 19, 1958 — | Aug. 05, 1987 | — |
| 7. Noah Thornton has a mother Nancy Frier | Noah Thornton (122) Feb. 15, 1994 — | mother (126) | Nancy Frier (112) Aug. 19, 1958 — | Feb. 15, 1994 | — |
| 8. Joe Thornton is married to Louise Hensley | Joe Thornton (104) Mar. 16, 1928 Jun. 14, 1992 | married to (128) | Louise Hensley (118) Nov. 04, 1929 — | Sep. 17, 1955 | Jun. 14, 1992 |

As indicated in Table 2, start and stop properties can be associated with the subjects and objects of the statements, as well as the statements themselves. For example, the subject (Mike Thornton) of statement 1 of Table 2 has a start date of 05/29/57, indicating Mike Thornton's birth date, and an open stop date, indicating Mike Thornton is living. The statement with predicate father has a start date corresponding to Mike Thornton's birth date and a stop date of 06/14/92, indicating the father relationship with Joe Thornton ends on that date. By looking at the object (Joe Thornton) stop date, it can be seen that 06/14/92 corresponds to Joe Thornton's death, the reason for the stop date for the statement.

In one embodiment consistent with the invention, start and start properties can be associated with the statements and resources. Continuing with the example of statement 1 of Table 2, in this embodiment statement 1 can have a start property of 5/29/57, corresponding to the date Mike Thornton was born, and a stop property of 06/14/92. Without further information, the stop property can refer to a number of events by which the father relationship of Mike and Joe Thornton can end, including Mike's or Joe's death. In this embodiment, start and stop properties associated with subjects and objects can be used to obtain start and stop properties for the related statements as listed in Table 2. For example, the statements "Joe Thornton has a birth event of Mar. 16, 1928" "Joe Thornton has a death event of 06/14/92" can be used to determine the start and stop properties for Joe Thornton. The absence of a statement for a death event for Mike Thornton can indicate Mike Thornton has an open stop property. The above can illustrate that the lifetime of a statement can be further restrained by the lifetimes of its subject and object.

Referring again to FIG. 4, APIs 214 of FIG. 3, in response to the user 202 query, can obtain (404) the statements with start and stop properties from resources 204 matching the user 202 query, including the start and stop properties for the statements, as shown in Table 2, and can determine (406) the corresponding data for the graphical representations. Processor 208 of FIG. 3 can receive (408) the data and display (410) the corresponding screen image, such as image 100 of FIG. 1. Screen image 100 includes a view 130 in which the graphical representation can be displayed. Screen image 100 includes one or more file and view manipulation tools, such as pull down menus 132, action buttons 134 and scroll bar 136.

In addition to such known items or tools, screen image 100 includes time varying activation buttons, including START button 138, NEXT button 140, PREV (previous) button 142 and END button 144. It can be understood that varying means for implementing the functions or actions to be described with relation to the activation buttons can be used, including pull down menus, icons, keyboard entries, etc., and that the activation buttons shown in FIG. 1 are for illustrative purposes and are not restrictive as to the type, style and/or design of means user 202 can employ for displaying the time varying data provided by APIs 214. In the exemplary embodiment of FIG. 4, the choice of an activation button by user 202 is illustrated at 412.

When user 202 chooses start button 138, method 400 determines the earliest or base start property date (414), stores the date as the current active date (416) and displays (418) the corresponding subjects, objects and/or statements. For the earliest property, the display can include the one subject or object corresponding to the earliest start property. In one embodiment, displaying the corresponding subject or object at 418 includes hiding subjects, objects and statements not to be displayed as by painting those subjects, objects, or statements in the background color of the screen image. For the exemplary statements of Table 2, the earliest start date (03/16/28) corresponds with Joe Thornton (104). FIG. 2A illustrates the corresponding screen image 100a, wherein the subjects, objects, and statements besides Joe Thornton (104) are hidden.

When the NEXT button 140 is chosen, method 400 determines the next earliest start or stop property date (420) based on the stored current active date and again the method 400 stores the date determined as the current active date (422). If a start property is the next earliest date, as determined at 424, the display of the corresponding subjects, objects and/or predicates is added (426) to the screen image. When 424 determines that a stop property is the next earliest date, the display of the corresponding subjects, objects and/or predicates is hidden (428) from the screen image.

FIGS. 2B-I illustrates selection of the NEXT button 140 from FIG. 2A. For FIG. 2B, the next earliest date (11/04/29) corresponds to a start property for Louise Hensley. Thus, Louise Hensley (18) can be added to the screen image. FIGS. 2C-G correspond to the start property dates for statement 8 ("Joe Thornton married to (28) Louise Hensley") (9/17/55), Mike Thornton (5/29/57), Nancy Frier (08/19/58), statement 3 ("Mike Thornton married to (14) Nancy Frier") (11/08/82), and Jason Thornton (08/05/87), respectively. In one embodiment, illustrated with particularity in FIGS. 2C and 2F, it can be seen that the "married to" predicate can also correspond to a change of the name property used to label the nodes for Louise Hensley and Nancy Frier, respectively. Such name changes can be reflected in the statements returned by APIs 214. For example, Table 2 includes additional statements 3a, 3b, 8a and 8b associated with statements 3 and 8, respectively, as indicated below in Table 2A.

TABLE 2A

| Statement | Subject (Identifier) Start Stop | Predicate (Identifier) | Object (Literal) | Start | Stop |
|---|---|---|---|---|---|
| 3a. Person has a name "Nancy Frier" | Person Aug. 19, 1958 — | name | "Nancy Frier" | Aug. 19, 1958 | Nov. 08, 1982 |
| 3b. Person has a name "Nancy Thornton" | Person Aug. 19, 1958 — | name | "Nancy Thornton" | Nov. 02, 1982 | |
| 8a. Person has a name "Louise Hensley" | Person Nov. 04, 1929 — | name | "Louise Hensley" | Nov. 04, 1929 | Sep. 15, 1955- |
| b. Person has a name "Louise Thornton" | Person Nov. 04, 1929 — | name | "Louise Thornton" | Sep. 17, 1955 | |

Continuing with the selection of NEXT from FIG. 2G, the next earliest date corresponds to a stop property for Joe Thornton (06/14/92). Thus, in FIG. 2H, Joe Thornton (4) and the associated predicates "father" (6) and "married to" (28) are hidden. The selection of NEXT from FIG. 2H determines that the next earliest date corresponds to start date (02/15/94) for Noah Thornton (22). Thus, in FIG. 2I Noah Thornton (22) is added, as well as predicates "father" (24) and "mother" (26).

When the PREV button 142 is chosen, the method 400 can hide (430) corresponding subjects, objects, and/or statements for the current active date when the current active date is a start property date, as determined at 432. When the current active date is a stop property date, the method 400 adds (434) the corresponding subjects, objects, and/or statements for the current active date. The method 400 determines (436) and stores the previous earlier date as the current active date (438). It can be seen that selection of the PREV button 142 reverses the process described in relation with selection of the NEXT button 140 and the sequence of screen images 100b-i of FIGS. 2B-I.

When the END button 144 is chosen, the method 400 determines (440) the latest property date and store the latest date as the current date (442). Method 400 can displays (444) the subjects, predicates and objects for the statements and hide (446) those subjects, objects, and statements having stop properties equal to or less than the determined current date. FIG. 2I illustrates the resulting screen image 100i when the user 202 chooses the END button 144 for the exemplary data of Table 2 and Table 2A. In the embodiment of FIG. 4, the flow chart for method 400 indicates that after displaying the appropriate screen image (as at 418, 426, 428, 438 and 446) method 400 can return to 412 to await further button activations by user 202. User 202 can end the display or return to perform new queries using the file or view manipulation tools, such as pull down menus 132.

In addition to displaying time varying information as described above, the use of start and stop properties for the statements and resources can be used to filter the statements returned by APIs 214. In this embodiment, user 202 can specify a date, or range of dates with the query at 402. APIs 214 can obtain the start and stop properties (404) and return the graphical representation data (406) for those statements having a lifetime that includes the date(s) specified. For example, user 202 can specify the current date. Based on Table 2 and Table 2A, the lifetimes of statements 2-7, 3a, 3b, 8a and 8b include the current date, and those statements will be returned by APIs 214. Thus, it can be seen that the screen image for the specified date can include screen image 100i of FIG. 2I.

For a specified range of dates, the APIs 214 can return statements having lifetimes that overlap the specified range of dates. For example, user 202 can specify dates in the range of 01/01/50 to 01/01/90. Again using Table 2 and Table 2A, the lifetimes of statements 1-4, 6, 8, 3a, 3b, 8a and 8b can include the specified range and it can be seen that the screen image for the specified range can include screen image 100g of FIG. 2G. While APIs 214 can typically return statements including the current date, the current date can be adjusted to provide for date ranges, without having to re-fetch the data.

In one embodiment, scroll bar 136 of FIG. 1 can represent a timeline corresponding to the time from the earliest start property date of the returned statements to the latest stop property date of the returned statements. For the exemplary statements of Table 2 and Table 2A, the scroll bar can represent a timeline from the birth of Joe Thornton (03/16/28) to the current date. Slide 146, illustrated in FIGS. 2A-I, can be positioned on scroll bar 136 and can correspond to selecting a date for the screen image to be presented. Slide 146 can be activated when user 202 chooses one of the buttons 138-144, as indicated in phantom at 448 in FIG. 4. Thus, slide 146 can be inactive or hidden in screen image 100 of FIG. 1. For example, FIG. 2F illustrates slide 146 positioned at 01/01/85, thus screen image 100*f* can include statements having lifetimes that include the date 01/01/85.

The systems and methods described herein may not be limited to a particular hardware or software configuration. The techniques described herein can be implemented in hardware or software, or a combination thereof. The systems and methods can be implemented in one or more computer programs executing on one or more programmable computers, such as may be exemplified by processor 208, servers 210, or APIs 214, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

As provided herein, the processor(s) can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer (s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the Internet. References herein to microprocessor instructions or microprocessor-executable instructions, in accordance with the above, can be understood to include programmable hardware.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A computer-implemented method of using Resource Description Framework (RDF) reification to associate Semantic Web statements with start properties and stop properties related to lifetimes of the Semantic Web statements using a reification processor, comprising:
  accessing an RDF statement from a Semantic Web resource wherein the RDF statement includes a subject, a predicate, and an object;
  determining a lifetime of the subject of the RDF statement, wherein determining the lifetime of the subject is based on at least one of a start property of the subject and a stop property of the subject;
  determining a lifetime of the predicate of the RDF statement, wherein determining the lifetime of the predicate is based on at least one of a start property of the predicate and a stop property the predicate;
  determining a lifetime of the object of the RDF statement, wherein determining the lifetime of the object is based on at least one of a start property of the object and a stop property of the object;
  automatically determining a lifetime of the RDF statement based on an overlap of the lifetime of the subject, the lifetime of the predicate, and the lifetime of the object;

generating a reified RDF statement, using the reification processor, wherein the reified RDF statement includes the subject, the predicate, the object and the lifetime of the RDF statement; and storing the reified RDF statement in the Semantic Web resource.

2. The method of claim 1, further comprising:

receiving a Semantic Web query having an associated timeframe;

determining if the query timeframe is within the lifetime of a reified RDF statement in the Semantic Web resource; and accessing the reified RDF statement in response to the determination.

3. The method of claim 1, further comprising:

displaying on a display the subject and the object of the reified RDF statement as nodes;

displaying on the display the predicate of the reified RDF statement as an arc connecting the displayed nodes;

selecting a timeframe associated with the display; and hiding the nodes and the arc when the selected display timeframe is outside the lifetime of the reified RDF statement.

4. The method of claim 1, wherein automatically determining the lifetime of the RDF statement comprises selecting the lifetime of the subject of the RDF statement as the lifetime of the RDF statement.

5. The method of claim 1, wherein automatically determining the lifetime of the RDF statement comprises selecting the lifetime of the object of the RDF statement as the lifetime of the RDF statement.

6. The method of claim 1, wherein determining the lifetime of the RDF statement comprises:

comparing the lifetime of the object and the lifetime of the subject; and in response to the comparison, selecting an intersection of the compared lifetimes as the lifetime of the RDF statement.

7. The method of claim 1, wherein automatically determining the lifetime of the RDF statement comprises selecting the lifetime of the predicate of the RDF statement as the lifetime of the RDF statement.

8. The method of claim 1, wherein the lifetime of the RDF statement includes at least one of an open-ended start property and an open-ended stop property.

9. The method of claim 1, wherein the lifetime of the RDF statement is explicitly specified.

10. The method of claim 1, wherein the RDF statement is accessed from a Semantic Web resource and further comprising storing the reified RDF statement in the Semantic Web resource.

11. The method of claim 1, wherein the lifetime of at least one of the subject, object, and predicate includes at least one of an open-ended start property and an open-ended stop property.

12. The method of claim 1, wherein automatically determining a lifetime of the RDF statement further comprises determining the lifetime of the RDF statement based on at least one of a start and a stop property associated with the RDF statement.

13. A system for using Resource Description Framework (RDF) reification to associate Semantic Web statements with start properties and stop properties related to lifetimes of the Semantic Web statements, comprising:

a computer processor operable to access an RDF statement from a Semantic Web resource, wherein the RDF statement includes a subject, a predicate, and an object, determine a lifetime of the subject of the RDF statement, wherein determining the lifetime of the subject is based on at least one of a start property of the subject and a stop property of the subject, determine a lifetime of the predicate of the RDF statement, wherein determining the lifetime of the predicate is based on at least one of a start property of the predicate and a stop property of the predicate, determine a lifetime of the object of the RDF statement, wherein determining the lifetime of the object is based on at least one of a start property of the object and a stop property of the object, and determine a lifetime of the RDF statement based on an overlap of the lifetime of the subject, the lifetime of the predicate, and the lifetime of the object; and a reification processor operable to generate a reified RDF statement, wherein the reified RDF statement includes the subject, the predicate, the object and the lifetime of the RDF statement; and store the reified RDF statement in the Semantic Web resource.

14. The system of claim 13, wherein the computer processor is further operable to:

receive a Semantic Web query having an associated timeframe;

determine if the query timeframe is within the lifetime of a reified RDF statement in the Semantic Web resource; and access the reified RDF statement in response to the determination.

15. The system of claim 13, further comprising a display operable to:

display the subject and the object of the reified RDF statement as nodes;

display the predicate of the reified RDF statement as an arc connecting the displayed nodes;

select a timeframe associated with the display; and hide the nodes and the arc when the selected display timeframe is outside the lifetime of the reified RDF statement.

16. A non-transitory computer-readable medium comprising instructions for controlling a processor to use Resource Description Framework (RDF) reification to associate Semantic Web statements with start properties and stop properties related to lifetimes of the Semantic Web statements by:

accessing an RDF statement from a Semantic Web resource wherein the RDF statement includes a subject, a predicate, and an object;

determining a lifetime of the subject of the RDF statement, wherein determining the lifetime of the subject is based on at least one of a start property of the subject and a stop property of the subject;

determining a lifetime of the predicate of the RDF statement, wherein determining the lifetime of the predicate is based on at least one of a start property of the predicate and a stop property the predicate;

determining a lifetime of the object of the RDF statement, wherein determining the lifetime of the object is based on at least one of a start property of the object and a stop property of the object;

automatically determining a lifetime of the RDF statement based on an overlap of the lifetime of the subject, the lifetime of the predicate, and the lifetime of the object;

generating a reified RDF statement, using a reification processor, wherein the reified RDF statement includes the subject, the predicate, the object and the lifetime of the RDF statement; and storing the reified RDF statement in the Semantic Web resource.

17. The non-transitory computer-readable medium of claim 16 further comprising instructions for controlling the processor to:

receive a Semantic Web query having an associated timeframe;

determine if the query timeframe is within the lifetime of a reified RDF statement in the Semantic Web resource; and access the reified RDF statement in response to the determination.

18. The non-transitory computer-readable medium of claim 16 further comprising instructions for controlling the processor to:

display on a display the subject and the object of the reified RDF statement as nodes;

display on the display the predicate of the reified RDF statement as an arc connecting the displayed nodes;

select a timeframe associated with the display; and hide the nodes and the arc when the selected display timeframe is outside the lifetime of the reified RDF statement.

19. The non-transitory computer-readable medium of claim 16, wherein automatically determining the lifetime of the RDF statement comprises selecting the lifetime of the subject of the RDF statement as the lifetime of the RDF statement.

20. The non-transitory computer-readable medium of claim 16, wherein automatically determining the lifetime of the RDF statement comprises selecting the lifetime of the object of the RDF statement as the lifetime of the RDF statement.

21. The non-transitory computer-readable medium of claim 16 further comprising instructions for controlling the processor to:

compare the lifetime of the object and the lifetime of the subject; and in response to the comparison, select an intersection of the compared lifetimes as the lifetime of the RDF statement.

22. The non-transitory computer-readable medium of claim 16, wherein automatically determining the lifetime of the RDF statement comprises selecting the lifetime of the predicate of the RDF statement as the lifetime of the RDF statement.

* * * * *